US010813367B2

(12) United States Patent
Garrigues et al.

(10) Patent No.: US 10,813,367 B2
(45) Date of Patent: Oct. 27, 2020

(54) METHOD OF PRODUCING A FERMENTED MILK PRODUCT WITH IMPROVED CONTROL OF POST ACIDIFICATION

(71) Applicant: Chr. Hansen A/S, Hoersholm (DK)

(72) Inventors: Christel Garrigues, Frederiksberg C (DK); Christian Gilleladen, Copenhagen (DK); Mirjana Curic-Bawden, Brookfield, WI (US); Thomas Janzen, Broenshoej (DK); Mimi Birkelund, Oelsted (DK); Gäelle Lettier Buchhorn, Virum (DK); Kim Ib Soerensen, Farum (DK); Nanna Christensen, Copenhagen S (DK); Claus Svane, Rungsted Kyst (DK); Soeren Riis, Roedovre (DK); Martin Bastian Pedersen, Cadorago Como (IT); Jean-Marie Odinot, Remereville (FR); Luciana Jimenez, Paris (FR); Pascal Lanciaux, Gron (FR); Duncan Hamm, Singapore (SG); Choon Ming Siew, Nusajaya (MY)

(73) Assignee: CHR. HANSEN A/S, Hoersholm (DK)

( * ) Notice: Subject to any disclaimer, the term of this patent is extended or adjusted under 35 U.S.C. 154(b) by 26 days.

(21) Appl. No.: 15/317,682

(22) PCT Filed: Jun. 18, 2015

(86) PCT No.: PCT/EP2015/063767
§ 371 (c)(1),
(2) Date: Dec. 9, 2016

(87) PCT Pub. No.: WO2015/193459
PCT Pub. Date: Dec. 23, 2015

(65) Prior Publication Data
US 2017/0135360 A1 May 18, 2017

(30) Foreign Application Priority Data

Jun. 19, 2014 (EP) .................................. 14173196
Jul. 10, 2014 (EP) .................................. 14176627
Dec. 3, 2014 (EP) .................................. 14196125
Feb. 20, 2015 (EP) .................................. 15156025

(51) Int. Cl.
*A23C 9/123* (2006.01)
*A23C 9/12* (2006.01)

(52) U.S. Cl.
CPC ............ *A23C 9/1238* (2013.01); *A23C 9/123* (2013.01); *A23C 9/1206* (2013.01); *A23C 2260/05* (2013.01); *A23Y 2220/15* (2013.01); *A23Y 2220/29* (2013.01); *A23Y 2240/75* (2013.01)

(58) Field of Classification Search
CPC ...... A23C 9/123; A23C 9/1238; A23C 9/1206

USPC ......................................................... 426/43
See application file for complete search history.

(56) References Cited

U.S. PATENT DOCUMENTS

| 5,071,763 | A | 12/1991 | Somkuti et al. | |
|---|---|---|---|---|
| 5,382,438 | A | 1/1995 | Hottinger et al. | |
| 6,875,601 | B1 | 4/2005 | Benbadis et al. | |
| 9,980,499 | B2 * | 5/2018 | Fremaux | A23C 9/1238 |
| 2005/0196388 | A1 | 9/2005 | Benbadis et al. | |
| 2007/0292561 | A1 * | 12/2007 | Garault | A23C 9/1238 426/18 |
| 2009/0088391 | A1 | 4/2009 | Garault et al. | |
| 2009/0238921 | A1 | 9/2009 | Druesne et al. | |
| 2010/0021586 | A1 | 1/2010 | Jensen | |

FOREIGN PATENT DOCUMENTS

| CN | 101421390 A | 4/2009 |
|---|---|---|
| CN | 102695421 A | 9/2012 |
| CN | 103215199 A | 7/2013 |
| DE | 31 46 198 A1 | 5/1983 |
| EP | 1 929 875 A1 | 6/2008 |
| FR | 2 224 096 A1 | 10/1974 |
| FR | 2224096 | 10/1974 |
| JP | 2-268644 * | 2/1990 |
| JP | 2-268644 | 11/1990 |
| WO | WO 2006/042862 A1 | 4/2006 |
| WO | WO 2010/139765 A2 | 12/2010 |
| WO | WO 2011/000879 A2 | 1/2011 |
| WO | WO 2013/160413 A1 | 10/2013 |
| WO | WO 2013/169205 A1 | 11/2013 |

OTHER PUBLICATIONS

Mollet, B. et al. J. Bacteriology. 1990. 172: 5670-5676 (Year: 1990).*
Mollet, B. 1999. Int. Dairy J. 9: 11-15 (Year: 1999).*
JP H02 268644. Machine Translation (Year: 1990).*
Mercade et al., "Metabolism of *Lactococcus lactis* subsp. cremoris MG 1363 in acid stress conditions," International Journal of Food Microbiology, (Apr. 2000) vol. 55, No. 1-3, pp. 161-165, XP027347022.
Yi-Lin et al., "The correlation of growth performance and postacidification properties of *Lactobacillus delbrueckii* subsp. bulgaricus," Food Science and Technology (2012) vol. 37, No. 10, p. 7 (Abstract Only).

(Continued)

*Primary Examiner* — Hamid R Badr
(74) *Attorney, Agent, or Firm* — Foley & Lardner LLP

(57) ABSTRACT

The present invention provides methods of producing a fermented milk product comprising a step wherein milk is fermented, wherein: (a) the fermentation is initiated by a starter culture, which starter culture comprises lactic acid bacteria capable of metabolizing one or several carbohydrates present in the milk, (b) the fermentation is terminated by a decrease of the concentration of the one or several carbohydrates during fermentation, and (c) the decrease is at least also caused by the metabolic activity of the lactic acid bacteria. The invention further provides respective methods comprising a step, wherein at least part of the whey is separated from the fermented milk product.

23 Claims, 11 Drawing Sheets

(56) References Cited

OTHER PUBLICATIONS

Pool, et al; "Natural sweetening of food products by engineering *Lactococcus lactis* for glucose production"; Metabolic Engineering, 8(5): 456-464 (May 2006).
PCT International Search Report issued in Application No. PCT/EP2015/063767 dated Oct. 2, 2015.
PCT International Preliminary Report on Patentability issued in Application No. PCT/EP2015/063767 dated Dec. 20, 2016.
Mall et al., "Spontaneous Deletion Formation within the β-Galactosidase Gene of *Lactobacillus bulgaricus*," *Journal of Bacteriology*, pp. 5670-5676 (Oct. 1990).
Mollet et al., "Genetically Improved Starter Strains: Opportunities for the Dairy Industry," *International Dairy Journal*, vol. 9, pp. 11-15 (1999).
Thomas et al., "Lactose and Sucrose Utilization by *Streptococcus thermophilus*," *FEMS Microbiology Letters*, vol. 17, pp. 13-17 (1983).
MacBean, Packaging and the Shelf Life of Yogurt, *Food Packaging and Shelf Life*, pp. 143-156 (2009).
Wu et al., "Research Progress on Affecting Factors and Mechanisms of Yogurt Post-acidification," 2011, vol. 32, No. 1, pp. 240-245.
Lu, Food and Science & Technology, pp. 033-035 (2008).

\* cited by examiner

METHOD OF PRODUCING A FERMENTED MILK PRODUCT WITH IMPROVED CONTROL OF POST ACIDIFICATION

FIELD OF THE INVENTION

The present invention relates to methods of producing a fermented milk product comprising steps, wherein milk is fermented by a starter culture comprising lactic acid bacteria and wherein the fermentation is terminated by a decrease of the concentration of the carbohydrates that can be metabolized by the lactic acid bacteria. The methods of the present invention provide an improved control of post acidification, i.e. the acidification caused by the bacteria after the termination of the fermentation, for example during further processing and storage.

BACKGROUND OF THE INVENTION

Most of the current methods for producing fermented milk products can be characterized by the following series of steps:
 (a) milk is fermented using a starter culture comprising lactic acid bacteria (or LAB) capable of metabolizing glucose obtained from lactose present in the milk;
 (b) the fermentation causes the production of lactic acid, which causes a decrease of the pH from initially 6.4 to 6.8 (for cow milk) to a range between pH 3.8 and 4.7;
 (c) the fermentation is terminated by rapid cooling of the fermented milk product once the pH desired for the fermented product at issue has been reached.

This method is for example used to produce yoghurt and yoghurt beverages.

The rapid cooling of the fermented milk product at a predetermined pH value is carried out to terminate fermentation. Without cooling of the fermented product, the fermentation would continue. However, rapid cooling has disadvantages, as it leads to loss of texture. Avoiding a rapid cooling step would also spare a unit operation and thus reduce production costs.

Even in methods comprising a rapid cooling step, post acidification is observed, i.e. the production of lactic acid by the LAB after the termination of fermentation, i.e. after the desired pH has been reached. Post acidification is considered to represent one of the most important problems during fermentation of milk products today. The further decrease of pH value during processing and storage of the fermented milk product leads to problems with elevated acidity and reduced shelf life.

Post acidification therefore also has a negative effect on the shelf life of yoghurt. The shelf life of a yoghurt varies from 30 to 50 days depending on the country. During this time post acidification changes the quality of the yoghurt causing a sour product and high whey separation. Usually the quality of yoghurt is maintained as much of possible by keeping the product at a temperature between 4 and 8° C. during storage. At this temperature bacteria will only have a low activity. However, in many countries it is difficult to maintain the cool-chain during the storage.

As a consequence, the manufacture of Extended Shelf Life Yoghurt (ESL yoghurt), is of high interest, in particular in countries where it is difficult to maintain the cool-chain. The prior art methods of producing ESL yoghurt include a heat treatment step (usually 65° C./30 s) after the fermentation. The treatment causes a significant decrease in the number of bacteria used for fermentation as well as in the number of yeasts and moulds. The heating step also inhibits the activity of enzymes present in the yoghurt. As a consequence, the product has an extended shelf life of up to 9 months, wherein no or only low post acidification and flavour changes are observed.

However, the heat treatment has a negative effect on the quality of the yoghurt and changes in flavour and texture are obtained. A further negative effect of the heat treatment is that the health benefits obtained by eating live bacteria are diminished or lost.

One of the approaches for controlling post acidification resides in producing milk products with a relatively acidic pH. In these methods the further growth of the LAB and the production of lactic acid is inhibited by the acidic pH. However, the further production of lactic acid is only inhibited and not completely terminated and the method is obviously unsuitable for the production of fermented milk products with a mild taste.

It was assumed that post acidification is controlled by the metabolic activity of *L. bulgaricus* and caused by peptide uptake and strains with a deficiency in amino acid metabolism were generated to control post acidification (US2010/0021586 and WO2006/042862A1). Other approaches for controlling post acidification have been described in the prior art and include processes based on the use of specific LAB strains characterized by weakly post acidifying activity (WO2010/139765).

An alternative approach for minimizing post acidification is based on the control of the ratio of protein to lactose, the control of the buffering capacity and the maintenance of the buffering capacity and the pH within a predetermined range during fermentation (WO2013/169205). However, this approach requires the determination of a number of process parameters during fermentation and may require the addition of proteins or lactose or a buffer to the fermentation medium to ensure that the predetermined ranges are maintained during fermentation.

There is evidently still a need for improving methods for producing fermented milk products, which methods provide a better control of the post acidification activity in the fermented milk product.

SUMMARY OF THE INVENTION

This problem is now solved by the methods of the present invention, which provide a milk product with extremely low post acidification activity.

In particular, the present invention provides methods of producing a fermented milk product comprising a step wherein milk is fermented, wherein:
 (a) the fermentation is initiated by a starter culture, which starter culture comprises lactic acid bacteria capable of metabolizing one or several carbohydrates present in the milk,
 (b) the fermentation is terminated by a decrease of the concentration of the one or several carbohydrates during fermentation, and
 (c) the decrease is at least also caused by the metabolic activity of the lactic acid bacteria.

The present inventors surprisingly found that the termination of fermentation can be controlled by the concentration of carbohydrates in the milk to be fermented without significantly affecting the efficiency or time required for the fermentation. This is surprising as it was assumed that a reduction of the carbohydrates present in the milk that are available for the LAB for fermentation would inhibit or delay the fermentation process and thus result in an inefficient process that cannot be used for large scale production of fermented milk products, such as yoghurt. The inventors were further surprised to note that the fermentation process rapidly proceeds up to a point, where essentially all the carbohydrates have been consumed by the LAB and then terminates almost completely (FIG. 1; 1% lactose). It was expected that the fermentation process in the presence of a very low concentration of carbohydrates available for the LAB would result in a low acidification activity of the LAB over an extended period of time.

In an alternative, the present invention provides methods of producing a fermented milk product comprising a step, wherein milk is fermented using a starter culture, wherein:
 (i) the starter culture comprises *Streptococcus thermophilus* and *Lactobacillus delbrueckii* subsp. *bulgaricus*,
 (ii) the fermentation is conducted at a temperature between 22 and 45° C.,
 (iii) the fermentation is terminated by a decrease of the concentration of a carbohydrate during fermentation,
 (iv) the decrease is at least also caused by the metabolic activity of the lactic acid bacteria, and
wherein the fermented milk product is characterized in that the pH value of the product is maintained within a range of 0.3 pH units if stored after termination of the fermentation at the temperature used for fermentation in step (ii) over a period of 20 hours. This does not mean that the method necessarily includes a step, wherein the fermented milk product is maintained over a period of 20 hours after termination of the fermentation at the temperature used for fermentation in step (ii). This is just a functional test that can be used to confirm low post acidification. Maintaining a pH value pH of a fermented milk product within a range of 0.3 pH units over a period of 20 hours if stored at a temperature for fermentation is an indication of very low post acidification.

In a further embodiment, the present invention is directed to methods for producing a fermented milk product which are characterized by essentially no post acidification. Respective methods of producing a fermented milk product comprise a step, wherein milk is fermented using a starter culture, wherein:
 (i) the starter culture comprises *Streptococcus thermophilus* and *Lactobacillus delbrueckii* subsp. *bulgaricus*,
 (ii) the fermentation is conducted at a temperature between 22 and 45° C.,
 (iii) the fermentation is terminated by a decrease of the concentration of a carbohydrate during fermentation,
 (iv) the decrease is at least also caused by the metabolic activity of the lactic acid bacteria, and
wherein the fermented milk product is characterized in that the pH value of the product is maintained within a range of 0.1 pH units if stored after termination of the fermentation at the temperature used for fermentation in step (ii) over a period of 20 hours. Maintaining a pH value of a fermented milk product within a range of 0.1 pH units over a period of 20 hours if stored at a temperature for fermentation is an indication of absence of post acidification.

In a further alternative, the present invention provides methods of producing a fermented milk product comprising:
 (a) a step, wherein milk is fermented using a starter culture, wherein:
  (i) the fermentation is initiated using a milk and a starter culture, wherein the lactose concentration in the milk is in the range of 5 to 100 mg/g at the start of the fermentation
  (ii) the starter culture comprises *Streptococcus thermophilus* and *Lactobacillus delbrueckii* subsp. *bulgaricus*,
  (iii) the fermentation is conducted at a temperature between 22 and 45° C.,
  (iv) the fermentation is terminated by a decrease of the concentration of the lactose during fermentation,
  (v) the decrease is at least also caused by the metabolic activity of the lactic acid bacteria, and
 (b) a step, wherein the fermented product is packaged at a temperature between 15 and 45° C.

Due to the low post acidification this method does not require a cooling step after the fermentation.

The present invention further provides fermented milk products obtainable by these methods. These fermented milk products are characterized by maintaining the pH value of the product within a range of 0.3 pH units over a period of 20 hours if stored at the temperature used for fermentation. The products are further characterized by a very low concentration of the carbohydrates that can be metabolized by the LAB used for the fermentation. Other carbohydrates may be present in significantly higher concentration.

DETAILED DISCLOSURE OF THE INVENTION

In general the present invention provides methods of producing a fermented milk product comprising a step wherein milk is fermented, wherein:
 (a) the fermentation is initiated by a starter culture, which starter culture comprises lactic acid bacteria capable of metabolizing one or several carbohydrates present in the milk,
 (b) the fermentation is terminated by a decrease of the concentration of the one or several carbohydrates during fermentation, and
 (c) the decrease is at least also caused by the metabolic activity of the lactic acid bacteria.

In the context of the present application, the term "milk" is broadly used in its common meaning to refer to liquids produced by the mammary glands of animals or by plants. In accordance with the present invention the milk may have been processed and the term "milk" includes whole milk, skim milk, fat-free milk, low fat milk, full fat milk, lactose-reduced milk, or concentrated milk. Fat-free milk is non-fat or skim milk product. Low-fat milk is typically defined as milk that contains from about 1% to about 2% fat. Full fat milk often contains 2% fat or more. The term "milk" is intended to encompass milks from different mammals and plant sources. Mammal sources of milk include, but are not limited to cow, sheep, goat, buffalo, camel, llama, mare and deer. Plant sources of milk include, but are not limited to, milk extracted from soy bean, pea, peanut, barley, rice, oat, quinoa, almond, cashew, coconut, hazelnut, hemp, sesame seed and sunflower seed.

In the methods and products of the present invention, milk derived from cows is most preferably used as a starting material for the fermentation.

Lactose-reduced milk has been used in some of the examples of the present application and is commercially available (for example from Select Milk Producers Inc., Texas, USA). Lactose-reduced milk can be produced according to any method known in the art, including hydrolyzing the lactose by lactase enzyme to glucose and galactose, or by nanofiltration, electrodialysis, ion exchange chromatography and centrifugation.

The tem "milk base" is broadly used in the present application to refer to a composition based on milk or milk components which can be used as a medium for growth and fermentation of LAB. The milk base comprises components derived from milk and any other component that can be used for the purpose of growing or fermenting LAB.

In the context of the present application, the term "lactic acid bacteria" or "LAB" is used to refer to food-grade bacteria producing lactic acid as the major metabolic end-product of carbohydrate fermentation. These bacteria are related by their common metabolic and physiological characteristics and are usually Gram positive, low-GC, acid tolerant, non-sporulating, nonrespiring, rod-shaped bacilli or cocci. During the fermentation stage, the consumption of lactose by these bacteria causes the formation of lactic acid, reducing the pH and leading to the formation of a protein coagulum. These bacteria are thus responsible for the acidification of milk and for the texture of the dairy product. As used herein, the term "lactic acid bacteria" encompasses, but is not limited to, bacteria belonging to the genus of *Lactobacillus* spp., *Bifidobacterium* spp., *Streptococcus* spp., *Lactococcus* spp., such as *Lactobacillus delbrueckii* subsp. *bulgaricus, Streptococcus thermophilus, Lactobacillus lactis, Bifidobacterium animalis, Lactococcus lactis, Lactobacillus paracasei, Lactobacillus plantarum, Lactobacillus helveticus, Lactobacillus acidophilus, Bifidobacterium breve* and *Leuconostoc* spp.

The fermentation step of the process for manufacturing fermented dairy products comprises the addition of a starter culture to milk. The term "starter" or "starter culture" as used in the present context refers to a culture of one or more food-grade micro-organisms, in particular lactic acid bacteria, which are responsible for the acidification of the milk base. Starter cultures may be fresh, frozen or freeze-dried. For the production of a fermented dairy product, the starter can be added in an amount from 0.01 to 3%, preferably from 0.01 to 0.025% by volume of the total amount of milk.

The term "capable of metabolizing one or several carbohydrates present in the milk" is used in the context of the present invention to describe the metabolic activity of LAB which causes production of lactic acid as the major metabolic end-product of carbohydrate fermentation. As will be explained in more detail below, the LAB may be able to metabolize one, several or all carbohydrates present in the milk. The carbohydrates may be present in natural milk or may have been added to the milk.

In certain embodiments, the present invention provides methods using LAB capable to metabolize lactose and glucose. In other embodiments, the invention provides methods using LAB with a deficiency in glucose metabolism which LAB are capable to metabolize other carbohydrates, such as lactose and galactose. In further alternatives the present invention provides methods using LAB with a deficiency in lactose metabolism which LAB are capable to metabolize other carbohydrates, such as glucose.

The methods of the present invention are characterized by a step, wherein milk is fermented and the fermentation is terminated by a decrease of the concentration of the one or several carbohydrates during fermentation. This means that the LAB present in the fermentation medium can no longer produce significant amounts of lactic acid due to a very low concentration of carbohydrates that can be metabolized. In one embodiment, termination of fermentation can be characterized by a pH value that is maintained within a range of less than 0.3 pH units while the culture is maintained at the temperature used for fermentation for 20 hours. For example, if a method of producing a fermented milk product comprising a step wherein milk is fermented as described above is carried out, one can easily test whether termination of fermentation is due to a decrease of the concentration of the one or several carbohydrates during fermentation by maintaining the product at the temperature for fermentation for 20 hours. If the pH does not change by more than 0.3 pH units during that time than termination of fermentation was caused by the decrease of the concentration of the one or several carbohydrates during fermentation.

The prior art methods which terminate fermentation by cooling as soon as the desired pH is achieved cannot meet this test, as the residual carbohydrates available for metabolic activity will cause significant post acidification at the temperature used for fermentation (FIG. 1, 3% curve; FIGS. 2 and 3 lowest curve).

The methods of the present invention can further be characterized in that the decrease of the concentration of the carbohydrates is at least also caused by the metabolic activity of the lactic acid bacteria. This means that the lactic acid bacteria contribute to the decrease of the carbohydrates, although other components, e.g. enzymes such as lactase, may also contribute to the decrease of the carbohydrate that can be metabolized during fermentation.

In some embodiments the methods of the present invention comprise a step, wherein the fermented product is packaged at a temperature between 15 and 45° C. As indicated above, one of the main problems of the prior art resides in the need of rapid cooling of the fermentation product to terminate fermentation. The methods of the present invention may comprise a step, wherein fermented product is packaged at a temperature between 15 and 45° C. This shows that contrary to the prior art methods, rapid cooling is not absolutely necessary.

According to one alternative, the termination of fermentation can be characterized by the concentration of the one or several carbohydrates that can be metabolized by the lactic acid bacteria. At the termination of fermentation the concentration of the carbohydrate metabolized by the lactic acid bacteria can be in the range of less than 100 mg/g, such as less than 30 mg/g, including a range between 25 mg/g and 0.01 mg/g, or a range between 5 mg/g and 0.01 mg/g.

As indicated above, the methods of producing a fermented milk product according to the present invention may further be characterized by a particularly stable pH value during storage. The fermented product may be maintained within a range of 0.3 pH units over a period of 20 hours when stored at the temperature used for fermentation.

In a further alternative, the methods of producing a fermented milk product according to the present invention can be characterized by a temperature during fermentation of between 22 and 45° C. This temperature range includes the range used for mesophilic and thermophilic cultures. In the context of the present application the term "mesophilic" refers to microorganisms that grow best at moderate temperatures, i.e. at temperatures from 15° C. to 40° C. The industrially most useful mesophilic bacteria include *Lactococcus* spp. and *Leuconostoc* spp. Mesophilic dairy products include such dairy products as buttermilk, sour milk, cultured milk, smetana, sour cream and fresh cheese, such as quark, tvarog and cream cheese. In the context of the present application the term "thermophilic" refers to microorganisms that grow best at temperatures above 40° C. The industrially most useful thermophilic bacteria include *Streptococcus* spp. and *Lactobacillus* spp. Thermophilic dairy products include such dairy products as yoghurt.

According to one embodiment, the present invention provides a method as described above, wherein mesophilic and thermophilic cultures are both fermented at a temperature between 22 and 45° C.

The present invention further provides fermented milk products obtainable by the methods as described above. The fermented milk products of the present invention are preferably fermented food products, including yoghurt, fruit yoghurt, yoghurt beverage or cheese.

In its most preferred embodiment all methods of the present invention are methods for producing a yoghurt and the product of the present invention is yoghurt.

In the context of the present application, the term "yoghurt" refers to products comprising *Streptococcus thermophilus* and *Lactobacillus delbrueckii* subsp. *bulgaricus* and optionally other microorganisms such as *Lactobacillus delbrueckii* subsp. *lactis, Bifidobacterium animalis* subsp. *lactis, Lactococcus lactis, Lactobacillus acidophilus* and *Lactobacillus paracasei*, or any microorganism derived therefrom. The lactic acid strains other than *Streptococcus thermophilus* and *Lactobacillus delbrueckii* subsp. *bulgaricus*, are included to give the finished product various properties, such as the property of promoting the equilibrium of the flora. As used herein, the term "yoghurt" encompasses set yoghurt, stirred yoghurt, drinking yoghurt, Petit Suisse, heat treated yoghurt, strained or Greek style yoghurt characterized by a high protein level and yoghurt-like products.

In particular, term "yoghurt" encompasses, but is not limited to, yoghurt as defined according to French and European regulations, e.g. coagulated dairy products obtained by lactic acid fermentation by means of specific thermophilic lactic acid bacteria only (i.e. *Lactobacillus delbrueckii* subsp. *bulgaricus* and *Streptococcus thermophilus*) which are cultured simultaneously and are found to be live in the final product in an amount of at least 10 million CFU (colony-forming unit)/g. Yoghurts may optionally contain added dairy raw materials (e.g. cream) or other ingredients such as sugar or sweetening agents, one or more flavouring(s), fruit, cereals, or nutritional substances, especially vitamins, minerals and fibers, as well as stabilizers and thickeners. In one alternative yoghurt meets the specifications for fermented milks and yoghurts of the AFNOR NF 04-600 standard and/or the codex StanA-IIa-1975 standard. In order to satisfy the AFNOR NF 04-600 standard, the product must not have been heated after fermentation and the dairy raw materials must represent a minimum of 70% (m/m) of the finished product.

Cheese, such as Mozzarella and Pizza cheese as well as Feta, can also be prepared by fermentation using a starter culture comprising *Streptococcus thermophilus* and *Lactobacillus delbrueckii* subsp. *bulgaricus* (Hoier et al. (2010) in The Technology of Cheesemaking, 2$^{nd}$ Ed. Blackwell Publishing, Oxford; 166-192).

The methods of the present invention encompass numerous different alternatives. The following alternatives will be described in some detail below:
(A) Methods of producing a fermented milk product using milk with low lactose content.
(B) Lactose deficient LAB and methods of producing a fermented milk product using lactose deficient LAB.
(C) Methods for a fermented milk product with extended shelf life
(D) Methods of producing a fermented milk product using glucose deficient LAB.
(E) Methods of producing a fermented milk product adding lactase to the fermentation.
(F) Methods of producing a strained fermented milk product based on a product obtained with one of methods (A) to (E).
(G) Methods of producing a pasta filata cheese product using one of methods (A) to (E).

A: Methods for Producing a Fermented Milk Product Using Low Lactose Milk

According to this alternative the present invention provides methods of producing a fermented milk product comprising a step wherein milk is fermented, wherein:
(a) the fermentation is initiated by a starter culture comprising lactic acid bacteria, which starter culture comprises *Streptococcus thermophilus* (ST) and *Lactobacillus delbrueckii* ssp. *bulgaricus* both capable of metabolizing lactose present in the milk,
(b) the fermentation is terminated by a decrease of the concentration of the lactose during fermentation, and
(c) the decrease is at least also caused by the metabolic activity of the lactic acid bacteria, wherein before addition of the starter culture the concentration of the lactose in the milk is below 30 mg/g and the concentration of the glucose in the milk is below 15 mg/g. In one alternative the concentration of lactose is below 25 mg/g or below 15 mg/g and the concentration of glucose is below 2 mg/g.

In one aspect of this approach the present invention provides methods of producing a fermented milk product comprising a step wherein milk is fermented, wherein:
(a) the fermentation is initiated by a starter culture comprising lactic acid bacteria, which starter culture comprises *Streptococcus thermophilus* (ST) and *Lactobacillus delbrueckii* ssp. *bulgaricus* both capable of metabolizing lactose present in the milk,
(b) the fermentation is terminated by a decrease of the concentration of the lactose during fermentation, and
(c) the decrease is caused by the metabolic activity of the lactic acid bacteria,
wherein the method further comprises a step, wherein the fermented product is packaged at a temperature between 15 and 45° C.

In one alternative, the method can be characterized in that the pH value of the fermented product is maintained within a range of 0.3 pH units or within a range of 0.1 pH units if stored after termination of the fermentation at the temperature used for fermentation over a period of 20 hours.

The lactose may be naturally present in the milk or may have been added to the milk.

In this alternative the fermentation is caused by LAB capable to metabolize lactose and the termination of fermentation is caused by a concentration of lactose that is so low that fermentation and production of lactic acid by the LAB is terminated. The present inventors surprisingly found that even these very low concentrations of lactose in the milk provide sufficient carbohydrate source for rapid fermentation. It was further found that once the concentration of the lactose was reduced below a certain threshold, the fermentation is rapidly terminated (Example 1, FIG. 1).

The initial lactose concentration in the milk may be below 30 mg/g, for example between 30 mg/g and 5 mg/g, or between 15 mg/g and 5 mg/g, or between 10 mg/g and 5 mg/g.

Milk with reduced lactose concentration can be commercially obtained or produced according to methods well known in the art.

In one embodiment of this alternative, the milk contains a reduced lactose content and no additional carbohydrates not naturally present in cow milk. Accordingly, the initial glucose concentration in the milk can be significantly below 15 mg/g, such as below 2 mg/g. Fermentation may be carried out on milk with a reduced lactose content and without any carbohydrates added to the natural cow milk.

In another embodiment of this alternative, the milk contains a reduced lactose content and additional carbohydrates not naturally present in cow milk, such as glucose or sucrose.

B: Lactose Deficient LAB and Methods of Producing a Fermented Milk Product Using Lactose Deficient LAB In a further embodiment the present invention provides lactose deficient LAB.

The terms "deficiency in lactose metabolism" and "lactose deficient" are used in the context of the present invention to characterize LAB which either partially or completely lost the ability to use lactose as a source for cell growth or maintaining cell viability. Respective LAB are capable to metabolize one or several carbohydrates selected from sucrose, galactose and/or glucose or another fermentable carbohydrate. Since these carbohydrates are not naturally present in milk in sufficient amounts to support fermentation by lactose deficient mutants, it will be necessary to add these carbohydrates to the milk. Lactose deficient and partially deficient LAB can be characterized as white colonies on a medium containing lactose and X-Gal.

As is described in detail in Example 2 below, the present inventors isolated a number of lactose deficient LAB, in particular strains of *Streptococcus thermophilus* (ST) and *Lactobacillus delbrueckii* ssp. *bulgaricus* (LB). These lactose deficient LAB metabolize sucrose.

The strains were derived from the strain CHCC15914 which is not lactose deficient. Accordingly, the present invention provides an isolated *Streptococcus thermophilus* strain, which strain is the strain deposited with DSMZ-Deutsche Sammlung von Mikroorganismen und Zellkulturen GmbH, Inhoffenstr. 7B, D-38124 Braunschweig, on 2014 Jun. 12 under the accession no. DSM 28909.

According to another aspect, the present invention relates to the following lactose deficient LAB strains:
(a) a *Streptococcus thermophilus* strain, which strain is:
    (i) the strain deposited with DSMZ-Deutsche Sammlung von Mikroorganismen und Zellkulturen GmbH, Inhoffenstr. 7B, D-38124 Braunschweig, on 2014 Jun. 12 under the accession no. DSM 28952;
    (ii) or a strain derived from DSM 28952, wherein the derived strain is further characterized as having the ability to generate white colonies on a medium containing lactose and X-Gal;
(b) a *Streptococcus thermophilus* strain, which strain is:
    (i) the strain deposited with DSMZ-Deutsche Sammlung von Mikroorganismen und Zellkulturen GmbH, Inhoffenstr. 7B, D-38124 Braunschweig, on 2014 Jun. 12 under the accession no. DSM 28953;
    (ii) or a strain derived from DSM 28953, wherein the derived strain is further characterized as having the ability to generate white colonies on a medium containing lactose and X-Gal;
(c) a *Lactobacillus delbrueckii* ssp. *bulgaricus* strain, which strain is:
    (i) the strain deposited with DSMZ-Deutsche Sammlung von Mikroorganismen und Zellkulturen GmbH, Inhoffenstr. 7B, D-38124 Braunschweig, on 2014 Jun. 12 under the accession no. DSM 28910;
    (ii) or a strain derived from DSM 28910, wherein the derived strain is further characterized as having the ability to generate white colonies on a medium containing lactose and X-Gal.

The present invention further relates to the use of these strains in the methods of producing a fermented milk product as described herein. Further, the invention relates to fermented food products, comprising one or several of the following strains:
(a) a *Streptococcus thermophilus* strain, which strain is:
    (i) the strain deposited with DSMZ-Deutsche Sammlung von Mikroorganismen und Zellkulturen GmbH, Inhoffenstr. 7B, D-38124 Braunschweig, on 2014 Jun. 12 under the accession no. DSM 28952;
    (ii) or a strain derived from DSM 28952, wherein the derived strain is further characterized as having the ability to generate white colonies on a medium containing lactose and X-Gal;
(b) a *Streptococcus thermophilus* strain, which strain is:
    (i) the strain deposited with DSMZ-Deutsche Sammlung von Mikroorganismen und Zellkulturen GmbH, Inhoffenstr. 7B, D-38124 Braunschweig, on 2014 Jun. 12 under the accession no. DSM 28953;
    (ii) or a strain derived from DSM 28953, wherein the derived strain is further characterized as having the ability to generate white colonies on a medium containing lactose and X-Gal;
(c) a *Lactobacillus delbrueckii* ssp. *bulgaricus* strain, which strain is:
    (i) the strain deposited with DSMZ-Deutsche Sammlung von Mikroorganismen und Zellkulturen GmbH, Inhoffenstr. 7B, D-38124 Braunschweig, on 2014 Jun. 12 under the accession no. DSM 28910;
    (ii) or a strain derived from DSM 28910, wherein the derived strain is further characterized as having the ability to generate white colonies on a medium containing lactose and X-Gal.

The fermented food products can be a yoghurt, a fruit yoghurt, a yoghurt beverage or a cheese.

According to this approach the present invention also provides methods of producing a fermented milk product comprising a step wherein milk is fermented, wherein:
(a) the fermentation is initiated by a starter culture, which starter culture comprises *Streptococcus thermophilus* with a deficiency in lactose metabolism and *Lactobacillus delbrueckii* ssp. *bulgaricus* with a deficiency in lactose metabolism,
(b) a carbohydrate is added to the milk that can be metabolized by the *Streptococcus thermophilus* and the *Lactobacillus delbrueckii* ssp. *Bulgaricus* as defined in (a),
(c) the fermentation is terminated by a decrease of the concentration of the carbohydrates added to the milk, and
(d) the decrease is at least also caused by the metabolic activity of the *Streptococcus thermophilus* and the *Lactobacillus delbrueckii* ssp. *Bulgaricus* as defined in (a).

In some embodiments the method is further characterized as comprising a step, wherein the fermented product is packaged at a temperature between 15 and 45° C.

In other alternatives, the method can be characterized in that the pH value of the fermented product is maintained within a range of 0.3 pH or within a range of 0.1 pH units if stored after termination of the fermentation at the temperature used for fermentation over a period of 20 hours.

The total concentration of carbohydrates that can be metabolized by the *Streptococcus thermophilus* and the *Lactobacillus delbrueckii* ssp. *Bulgaricus* as defined in (a) can be in the range of 30 mg/g to 2 mg/g, or in the range of 20 mg/g 3 mg/g or in the range of 10 mg/g to 4 mg/g.

This way of proceeding has the advantage that normal milk with a lactose concentration of around 5% (50 mg/g)

can be used in the production process and that the fermentation can be precisely controlled by the amount of carbohydrate added. The concentration of carbohydrate to be added can be determined in trials testing desired fermentation conditions, including final pH, temperature, starter culture, etc.

In a preferred embodiment of this alternative, the fermentation is carried out using LAB that are able to metabolize sucrose (suc+) and sucrose is added to the milk before fermentation. In one alternative the concentration of sucrose is in the range of 30 mg/g to 2 mg/g, or in the range of 20 mg/g to 3 mg/g or in the range of 10 mg/g to 4 mg/g.

In one aspect step (a) of the above method is carried out using of one or several of the following strains
- (a) a *Streptococcus thermophilus* strain, which strain is:
  - (i) the strain deposited with DSMZ-Deutsche Sammlung von Mikroorganismen and Zellkulturen GmbH, Inhoffenstr. 7B, D-38124 Braunschweig, on 2014 Jun. 12 under the accession no. DSM 28952;
  - (ii) or a strain derived from DSM 28952, wherein the derived strain is further characterized as having the ability to generate white colonies on a medium containing lactose and X-Gal;
- (b) a *Streptococcus thermophilus* strain, which strain is:
  - (i) the strain deposited with DSMZ-Deutsche Sammlung von Mikroorganismen und Zellkulturen GmbH, Inhoffenstr. 7B, D-38124 Braunschweig, on 2014 Jun. 12 under the accession no. DSM 28953;
  - (ii) or a strain derived from DSM 28953, wherein the derived strain is further characterized as having the ability to generate white colonies on a medium containing lactose and X-Gal;
- (c) a *Lactobacillus delbrueckii* ssp. *bulgaricus* strain, which strain is:
  - (i) the strain deposited with DSMZ-Deutsche Sammlung von Mikroorganismen und Zellkulturen GmbH, Inhoffenstr. 7B, D-38124 Braunschweig, on 2014 Jun. 12 under the accession no. DSM 28910;
  - (ii) or a strain derived from DSM 28910, wherein the derived strain is further characterized as having the ability to generate white colonies on a medium containing lactose and X-Gal.

C: Methods for a Fermented Milk Product with Extended Shelf Life

According to one embodiment of the present invention, the methods for controlling post acidification described above, in particular the methods described in section B, above, are used to generate a fermented milk product with extended shelf life.

Respective method of producing a fermented milk product may for example comprise a step wherein milk is fermented, wherein:
- (a) the fermentation is initiated by a starter culture, which starter culture comprises lactic acid bacteria capable of metabolizing one or several carbohydrates present in the milk,
- (b) the fermentation is terminated by a decrease of the concentration of the one or several carbohydrates during fermentation, and
- (c) the decrease is at least also caused by the metabolic activity of the lactic acid bacteria, wherein the fermented product is characterized in that the pH value of the product is maintained within a range of 0.3 pH units if stored after termination of the fermentation for a period of 6 months. In a particularly preferred embodiment, the fermented product is characterized in that the pH value of the product is maintained within a range of 0.3 pH units if stored after termination of the fermentation for a period of 12 months. The product may be stored at a temperature between 2° C. and room temperature. Storage at refrigeration temperature, i.e. between 4 and 8° C., is preferred.

As indicated above, it is not required to store the product for several months. The method for producing a fermented milk product according to the present invention is characterized by a product obtainable by the method that maintains stability over the time period indicated. In one aspect the present invention provides a method of producing a fermented milk product comprises a step wherein milk is fermented using a starter culture, wherein the product obtainable by the method is stored for 6 or 12 months.

In an alternative embodiment, the method of producing a fermented milk product comprises a step wherein milk is fermented using a starter culture, wherein:
- (i) the starter culture comprises *Streptococcus thermophilus* and *Lactobacillus delbrueckii* subsp. *bulgaricus*,
- (ii) the fermentation is conducted at a temperature between 22 and 45° C.,
- (iii) the fermentation is terminated by a decrease of the concentration of a carbohydrate during fermentation,
- (iv) the decrease is at least also caused by the metabolic activity of the lactic acid bacteria, and wherein the fermented product is characterized in that the pH value of the product is maintained within a range of 0.3 pH units if stored after termination of the fermentation for a period of 6 or 12 months.

In a further alternative, methods of producing a fermented milk product are provided which comprise the following steps:
- (a) a step, wherein milk is fermented using a starter culture, wherein:
  - (i) the fermentation is initiated using a milk and a starter culture, wherein the lactose concentration in the milk is in the range of 5 to 100 mg/g at the start of the fermentation
  - (ii) the starter culture comprises *Streptococcus thermophilus* and *Lactobacillus delbrueckii* subsp. *bulgaricus,*
  - (iii) the fermentation is conducted at a temperature between 22 and 45° C.,
  - (iv) the fermentation is terminated by a decrease of the concentration of the lactose during fermentation,
  - (v) the decrease is at least also caused by the metabolic activity of the lactic acid bacteria, and
- (b) a step, wherein the fermented product is packaged at a temperature between 15 and 45° C., wherein the fermented product is characterized in that the pH value of the product is maintained within a range of 0.3 pH units if stored after termination of the fermentation for a period of 6 or 12 months.

According to one embodiment these methods use lactic acid bacteria for fermentation that are not capable to metabolize lactose. The lactic acid bacteria may be capable to metabolize sucrose. In a particularly preferred embodiment these methods make use of a starter culture comprising one or several of the following strains:
- (a) a *Streptococcus thermophilus* strain, which strain is:
  - (i) the strain deposited with DSMZ-Deutsche Sammlung von Mikroorganismen und Zellkulturen GmbH, Inhoffenstr. 7B, D-38124 Braunschweig, on 2014 Jun. 12 under the accession no. DSM 28952;
  - (ii) or a strain derived from DSM 28952, wherein the derived strain is further characterized as having the ability to generate white colonies on a medium containing lactose and X-Gal;

(b) a *Streptococcus thermophilus* strain, which strain is:
  (i) the strain deposited with DSMZ-Deutsche Sammlung von Mikroorganismen und Zellkulturen GmbH, Inhoffenstr. 7B, D-38124 Braunschweig, on 2014 Jun. 12 under the accession no. DSM 28953;
  (ii) or a strain derived from DSM 28953, wherein the derived strain is further characterized as having the ability to generate white colonies on a medium containing lactose and X-Gal;
(c) a *Lactobacillus delbrueckii* ssp. *bulgaricus* strain, which strain is:
  (i) the strain deposited with DSMZ-Deutsche Sammlung von Mikroorganismen and Zellkulturen GmbH, Inhoffenstr. 7B, D-38124 Braunschweig, on 2014 Jun. 12 under the accession no. DSM 28910;
  (ii) or a strain derived from DSM 28910, wherein the derived strain is further characterized as having the ability to generate white colonies on a medium containing lactose and X-Gal.

For the fermentation of yoghurt, it is preferred that a starter culture is used that comprises a *Streptococcus thermophilus* strain and a *Lactobacillus delbrueckii* ssp. *bulgaricus* strain as described above.

The method may further comprise a heat treatment after the fermentation. The heat treatment can for example be carried out at a temperature in the range of 30 to 65° C. for 10 to 30 seconds and is preferably carried out at a temperature in the range of 40 to 55° C. for 10 to 25 seconds.

The present invention also provides fermented milk products obtainable by the methods described above. The fermented milk product can be a yoghurt, a fruit yoghurt, a yoghurt beverage or a cheese. The invention therefore provides set yoghurt, stirred yoghurt, drinking yoghurt, Petit Suisse, heat treated yoghurt, strained or Greek style yoghurt characterized by a high protein level and yoghurt-like products obtainable by these methods.

D. Methods of Producing a Fermented Milk Product Using Glucose Deficient LAB

In this alternative, the present invention provides methods of producing a fermented milk product comprising a step wherein milk is fermented, wherein:
  (a) the fermentation is initiated by a starter culture, which starter culture comprises *Streptococcus thermophilus* with a deficiency in glucose metabolism and *Lactobacillus delbrueckii* ssp. *bulgaricus* with a deficiency in glucose metabolism,
  (b) the fermentation is terminated by a decrease of the concentration of lactose during fermentation, and
  (c) the decrease is at least also caused by the metabolic activity of the lactic acid bacteria.

In a preferred aspect, this method can further be characterized as comprising a step, wherein the fermented product is packaged at a temperature between 15 and 45° C.

In other alternatives, the method can be characterized in that the pH value of the fermented product is maintained within a range of 0.3 pH or within a range of 0.1 pH units if stored after termination of the fermentation at the temperature used for fermentation over a period of 20 hours.

The term "deficiency in glucose metabolism" and the term "glucose deficient" are both used in the context of the present invention to characterize LAB which either partially or completely lost the ability to use glucose as a source for cell growth or maintaining cell viability. A respective deficiency in glucose metabolism can for example be caused by a mutation in a gene inhibiting or inactivating expression or activity of the glucokinase protein or the glucose transporter protein. LAB with a deficiency in glucose metabolism can be characterized as increasing the glucose concentration in a culture medium, when grown on lactose as carbohydrate source. The increase of glucose is caused by glucose secretion of the glucose deficient LABs. Increase of glucose concentration in a culture medium can be determined by HPLC analysis, for example using a Dionex CarboPac PA 20 3*150 mm column (Thermo Fisher Scientific, product number 060142).

Several forms of glucose LAB with a deficiency in glucose metabolism have been described in the prior art, including LAB capable of metabolizing lactose and galactose (WO 2013/160413, Pool et al., 2006). Respective LAB may digest the main carbohydrate present in milk, lactose, thus generating glucose and galactose. The glucose deficient strains, such as the glucose deficient *Streptococcus thermophilus* strain described in WO 2013/160413, can metabolize galactose and further appears to secrete glucose. Alternative strains are described in WO 2013/160413, such as a 2-deoxyglucose resistant *Lactobacillus delbrueckii* mutant LAB strain, which cannot take up glucose or galactose present in the medium. However, the strain can take up lactose, digest lactose and use the glucose obtained from lactose digestion for growth and acid production. The publication of Pool et al., 2006 discloses a further method to obtain LAB with a deficiency in glucose metabolism. Using the general principles described in these publications numerous other LAB with the same or a similar deficiency in glucose metabolism can be generated by one of ordinary skill.

Since the taste of glucose is much sweeter than the taste of galactose, fermentation of milk using these glucose deficient mutants will increase the sweetness of the fermented product, while significantly decreasing the lactose concentration and without increasing the total concentration of carbohydrates (as described in great detail in WO2013/160413).

According to one alternative, the lactic acid bacteria with a deficiency in glucose metabolism may comprise a glucose deficient but galactose-fermenting *Streptococcus thermophilus* strain and/or a *Lactobacillus delbrueckii* strain with deficiency in glucose uptake. The *Lactobacillus delbrueckii* strain with deficiency in glucose uptake can metabolize lactose and utilize glucose derived from intracellular lactose hydrolysis.

The starter culture may comprise additional LABs or may consist of a mixture of these strains.

Accordingly, the present invention provides methods of producing a fermented milk product comprising a step wherein milk is fermented, wherein:
  (a) the fermentation is initiated by a starter culture, which starter culture comprises one or more *Streptococcus thermophilus* strains selected from CHCC16731, CHCC15757 and CHCC16404 and the *Lactobacillus delbrueckii* ssp. *bulgaricus* strain CHCC16159,
  (b) the fermentation is terminated by a decrease of the concentration of lactose during fermentation, and
  (c) the decrease is at least also caused by the metabolic activity of the lactic acid bacteria.

Using these glucose deficient LABs in the methods of the invention provides the additional advantage that the fermented milk product thus produced has a sweet taste.

This embodiment of the present invention may use a milk product with reduced lactose concentration for fermentation in order to terminate the fermentation due to a decrease of the concentration of the lactose during fermentation. Accordingly the present invention also provides methods of producing a fermented milk product comprising a step wherein milk is fermented, wherein:

(a) the fermentation is initiated by milk and a starter culture, wherein before addition of the starter culture the concentration of the lactose in the milk is below 30 mg/g and wherein the starter culture comprises *Streptococcus thermophilus* with a deficiency in glucose metabolism and *Lactobacillus delbrueckii* ssp. *bulgaricus* with a deficiency in glucose metabolism, (b) the fermentation is terminated by a decrease of the concentration of the lactose during fermentation, and (c) the decrease is at least also caused by the metabolic activity of the lactic acid bacteria.

The initial lactose concentration, i.e. the concentration before the addition of the starter culture, in the milk may be between 50 mg/g and 5 mg/g, or between 25 mg/g and 5 mg/g.

Milk with reduced lactose concentration can be commercially obtained or produced according to methods well known in the art.

E: Methods of Producing a Fermented Milk Product Adding Lactase to the Fermentation In this alternative, the present invention provides methods of producing a fermented milk product comprising a step wherein milk is fermented, wherein:

(a) the fermentation is initiated by a starter culture, which starter culture comprises lactic acid bacteria capable of metabolizing one or several carbohydrates present in the milk, (b) the fermentation is terminated by a decrease of the concentration of the one or several carbohydrates during fermentation, and (c) the decrease is at least also caused by the metabolic activity of the lactic acid bacteria, and wherein the fermentation is carried out in the presence of lactase in an initial concentration of 500 to 5000 NLU/l.

In a preferred aspect, this method can further be characterized as comprising a step, wherein the fermented product is packaged at a temperature between 15 and 45° C.

In other alternatives, the method can be characterized in that the pH value of the fermented product is maintained within a range of 0.3 pH or a range of 0.1 pH units if stored after termination of the fermentation at the temperature used for fermentation over a period of 20 hours.

Lactase is an enzyme that hydrolyzes lactose and produces glucose and galactose. Lactase is commercially available from many sources and can be prepared according to methods well known in the art. Lactase activity may be determined as units of neutral lactase activity (NLU). In accordance with the present invention the lactase activity is determined using the method as described by the Food Chemicals Codex (FCC) IV method.

F: Methods of Producing a Strained Fermented Milk Product Based on Product Obtained with One of Methods (A) to (E)

The methods A to E described above are particularly advantageous for the production of strained fermented milk products, such as strained yoghurt (Greek yoghurt, Labneh), quark, fromage frais and cream cheese. Strained fermented milk products are characterized by a production step, wherein whey is removed from the fermented milk by separation and/or filtration after fermentation resulting in relatively thick products with a high protein concentration.

Concentrating fermented milk using ultrafiltration or using a separator after conventional fermentation processes will lead to post acidification during the concentration step. Post acidification will impact several factors prior to and during the separation process. First of all, post acidification will cause a further decrease of the pH. As a consequence of the pH decrease, gel firmness will increase. As a further consequence of the pH decrease, the particle size in the yoghurt will increase. Finally, the shear stress will increase due to a continuing production and secretion of exopolysaccarides (or extracellular polymeric substances or EPS) by the LAB.

As a result, the fermented milk produced with this method will lack homogeneity. This will impact the major parameters of the separation process directly related to Stokes's law, as e.g. particle size, particle water binding capacity, viscosity of the serum phase and immobilized water in the protein matrix. Due to the further reduction in pH, for example from e.g. 4.65 down to pH 4.30, a lower product yield will be obtained and variation in the product quality in terms of taste, acidity and texture will be observed. In the prior art, strained fermented milk products are therefore produced using methods comprising method steps, which suppress post acidification, most frequently using a cooling step. However, the cooling step requires a significant amount of energy and has negative effects on the further processing of the product.

An overview over different methods of producing fermented milk products using a step of protein concentration is provided by FIG. 7. The left hand part of FIG. 7 shows methods using a step of concentration prior to fermentation and the right hand part of FIG. 6 shows methods using a step of concentration after fermentation by separation using centrifugation or ultrafiltration.

FIGS. 8 to 11 show results of proof of principle experiments illustrating the advantages that can be achieved by combining the methods of reducing post acidification as described above with methods for producing a fermented milk product that comprise a step, wherein whey is removed from the fermented milk by separation and/or filtration resulting in relatively thick yoghurt with a high protein concentration. These results were obtained with the following experimental set-up:

The following two batches of commercial cultures were fermented in the same type of milk base:

Mild 2.0 (from Chr. Hansen, Denmark);

Culture type Premium 1.0 (70%)+Culture type SSC17 (30%) (both from Chr. Hansen, Denmark).

The milk base used was skimmed milk; fermentation was carried out at a temperature of 40° C.

Both batches were fermented to pH 4.60. Samples were taken for texture analysis and fermentation was continued until a pH of 4.45 was reached. Again, the texture of the product was analyzed. The four yoghurt curds (two different cultures at two different pH values, 4.60 and 4.45) are processed in a Post Treatment Unit (FH Scandinox) after reaching the specified pH value. Different back pressures were applied to the cultures, between 4 to 9 or from 4 to 12 bars. Shear stress and complex modulus were determined using a rheometer.

FIGS. 8 to 11 show that both shear stress and complex modules are higher at pH 4.45 than at pH 4.60. Further the texture of the fermented milk product increases as a consequence of the drop in pH value from 4.60 to 4.45.

The culture Premium 1.0+SSC17 generated higher shear stress and complex modulus when compared to Mild 2.0, at both pH levels.

The texture decreased significantly when back pressure was applied, between 4 and up to 9 or from 4 up to 12 bars.

The proof-of-principle experiments therefore show that it will be possible and advantageous to separate whey from the fermented milk product using less shear stress and complex modulus with the methods for controlling post acidification as described above. The texture depends on the type of culture, the pH and the back pressure applied during process prior to inlet into the separator or UF. It was not possible to reduce the texture at pH 4.45 down to the texture at 4.60 even if high back pressure has been applied to the yoghurt curd.

The methods to control post acidification thus provide the possibility to ferment milk using LAB cultures to a specific pH depending on the carbohydrate added for fermentation. These methods provide an improved control of the pH in the yoghurt during post-fermentation processing and will thus in particular improve the separation step. In addition, the speed can be optimized as cooling is unnecessary and yield of production increases.

According to this aspect of the invention the following embodiments are amongst others provided:

1. A method of producing a strained fermented milk product comprising a step wherein milk is fermented, wherein:
   (a) the fermentation is initiated by a starter culture, which starter culture comprises lactic acid bacteria capable of metabolizing one or several carbohydrates present in the milk,
   (b) the fermentation is terminated by a decrease of the concentration of the one or several carbohydrates during fermentation,
   (c) the decrease is at least also caused by the metabolic activity of the lactic acid bacteria,
   (d) at least part of the whey is separated from the fermented milk product.
2. A method of producing a strained fermented milk product comprising a step wherein milk is fermented using a starter culture, wherein:
   (i) the starter culture comprises *Streptococcus thermophilus* and *Lactobacillus delbrueckii* subsp. *bulgaricus*,
   (ii) the fermentation is conducted at a temperature between 22 and 45° C.,
   (iii) the fermentation is terminated by a decrease of the concentration of a carbohydrate during fermentation,
   (iv) the decrease is at least also caused by the metabolic activity of the lactic acid bacteria,
   (v) at least part of the whey is separated from the fermented milk product, and
   wherein the fermented milk product prior to separation of the whey is characterized in that the pH value of the product is maintained within a range of 0.3 pH units or maintained within a range of 0.1 pH units if stored, processed or maintained after termination of the fermentation at the temperature used for fermentation in step (ii) over a period of 20 hours.
3. A method of producing a fermented milk product comprising:
   (a) a step, wherein milk is fermented using a starter culture, wherein:
      (i) the fermentation is initiated using a milk and a starter culture, wherein the lactose concentration in the milk is in the range of 5 to 100 mg/g at the start of the fermentation
      (ii) the starter culture comprises *Streptococcus thermophilus* and *Lactobacillus delbrueckii* subsp. *bulgaricus*,
      (iii) the fermentation is conducted at a temperature between 22 and 45° C.,
      (iv) the fermentation is terminated by a decrease of the concentration of the lactose during fermentation,
      (v) the decrease is at least also caused by the metabolic activity of the lactic acid bacteria, and (b) a step, wherein at least part of the whey is separated from the fermented milk product at a temperature between 15 and 45° C.,
   (c) a step, wherein the fermented product is packaged at a temperature between 15 and 45° C.,
   wherein the fermented milk product is characterized in that the pH value of the product is maintained within a range of 0.3 pH units or maintained within a range of 0.1 pH units if stored after termination of the fermentation at the temperature used for fermentation in step (ii) over a period of 20 hours.
4. The method of any one of embodiments 1 to 3, wherein the separation is carried out by filtration, including filtration using a nozzle separator, centrifuge or ultrafiltration with spiral filters or ceramic filters.
5. The method of any one of embodiments 1 to 4, wherein the strained fermented milk product is characterized by a protein content of 6 to 13% and a fat content of 0 to 10%.
6. The method of any one of embodiments 1 to 5, wherein the strained fermented milk product is characterized by a protein content of 6 to 10%.
7. The method of any one of embodiments 1 to 6, wherein the strained fermented milk product is a yoghurt, a Greek yoghurt, Labneh, Quark, fromage frais or cream cheese.
8. The method of any one of embodiments 1 to 7, wherein the separation of at least part of the whey from the fermented milk product is carried out without active cooling of the fermented milk product.
9. The method of any one of embodiments 1 to 8, wherein the starter culture comprises a lactose negative strain.
10. The method of any one of embodiments 1 to 9, wherein the starter culture comprises one or more LAB selected from strains CHCC18944, CHCC17861 and CHCC17862.
11. Fermented milk product obtainable by a method of any one of embodiments 1 to 10.
12. Fermented milk product according to embodiment 11, wherein the fermented milk product is a yoghurt, a fruit yoghurt, a yoghurt beverage or a cheese.

The separation of the whey may be carried out using a nozzle separator (centrifuge) commonly used in the art to separate whey from fermented milk products. Alternatively or additionally, ultra-filtration systems can be used, typically spiral filters or ceramic filters. In a further alternative plate and frame filters are used for applications with high solid protein and fat content, e.g. full fat cream cheese.

The strained yoghurt is characterized by a protein content of 6 to 13%. The product may further have a fat content of 0 to 10%.

Alternatively, the fermented product may be a quark or fromage frais. Quark and fromage frais are generally characterized by a protein content of 6 to 10%. Quark and fromage frais may further be characterized by a fat content of 6 to 10%.

In a further alternative, the fermented product is cream cheese. Cream cheese may be characterized by a protein content of 6 to 13%. Cream cheese may further be characterized by a fat content of 0 to 35%.

In preferred embodiments of this aspect of the present invention, the separation of at least part of the whey from the fermented milk product is carried out without active cooling of the fermented milk product. This does not mean that the product is maintained at the temperature used for fermentation, but simply that the product is not subject to cooling.

In a further embodiment, the above method of producing a strained fermented milk product is carried out using a starter culture comprising a lactose negative strain. As explained in part B above, the use of lactose negative strains for controlling post acidification is particularly advantageous. Accordingly, methods of producing a strained fermented milk product are provided which use a starter culture comprising one or more LAB selected from strains CHCC18944, CHCC17861 and CHCC17862.

This embodiment is particularly suitable for the production of Greek yoghurt, quark or cream cheese.

(G) Methods of Producing a Pasta Filata Cheese Product Using One of Methods (A) to (E).

The methods of the present invention as described in sections (A) to (E) above are particularly suitable for the preparation of a pasta filata cheese. A pasta filata cheese is a cheese produced by a method comprising a heat treatment step of the curd. The heat treatment can be carried out in a number of different ways, including steeping the curds in hot water or whey. In another alternative steam is injected into the curds. The heat treatment step imparts the finished cheese with a fibrous structure and particular stretching properties. Typical pasta filata cheeses are Mozzarella and Provolone, Caciocavallo, Pallone di Gravina, and Scamorza.

According to this aspect of the invention the following embodiments are amongst others provided:

1. A method of producing a pasta filata cheese comprising a step, wherein milk is fermented, wherein:
   (a) the fermentation is initiated by a starter culture, which starter culture comprises lactic acid bacteria capable of metabolizing one or several carbohydrates present in the milk,
   (b) the fermentation is terminated by a decrease of the concentration of the one or several carbohydrates during fermentation, and
   (c) the decrease is at least also caused by the metabolic activity of the lactic acid bacteria;
   (d) the fermented product is subjected to a heat treatment, for example by placing the fermented product in hot water or injecting steam into the fermented product.

2. A method of producing a pasta filata cheese comprising a step, wherein milk is fermented, wherein:
   (i) the starter culture comprises *Streptococcus thermophilus* and *Lactobacillus delbrueckii* subsp. *bulgaricus*,
   (ii) the fermentation is conducted at a temperature between 22 and 45° C.,
   (iii) the fermentation is terminated by a decrease of the concentration of a carbohydrate during fermentation,
   (iv) the decrease is at least also caused by the metabolic activity of the lactic acid bacteria, and
   wherein the fermented milk product is characterized in that the pH value of the product is maintained within a range of 0.3 pH units or maintained within a range of 0.1 pH units if stored after termination of the fermentation at the temperature used for fermentation in step (ii) over a period of 20 hours; and wherein the fermented product is subjected to a heat treatment, for example by placing the fermented product in hot water or injecting steam into the fermented product.

3. A method of producing a pasta filata cheese comprising a step, wherein milk is fermented, wherein:
   (a) a step, wherein milk is fermented using a starter culture, wherein:
      (i) the fermentation is initiated using a milk and a starter culture, wherein the lactose concentration in the milk is in the range of 5 to 100 mg/g at the start of the fermentation
      (ii) the starter culture comprises *Streptococcus thermophilus* and *Lactobacillus delbrueckii* subsp. *bulgaricus*,
      (iii) the fermentation is conducted at a temperature between 22 and 45° C.,
      (iv) the fermentation is terminated by a decrease of the concentration of the lactose during fermentation,
      (v) the decrease is at least also caused by the metabolic activity of the lactic acid bacteria, and
   (b) a step, wherein the fermented product is packaged at a temperature between 15 and 45° C.,
   wherein the fermented milk product is characterized in that the pH value of the product is maintained within a range of 0.3 pH units or maintained within a range of 0.1 pH units if stored after termination of the fermentation at the temperature used for fermentation in step (ii) over a period of 20 hours; and wherein the fermented product is subjected to a heat treatment, for example by placing the fermented product in hot water or injecting steam into the fermented product.

4. Method of producing a pasta filata cheese according to one of embodiments 1 to 3, wherein the lactic acid bacteria are capable to metabolize lactose and glucose and wherein before addition of the starter culture the concentration of the lactose in the milk is below 200 mg/g, for example between 100 mg/g and 5 mg/g, or between 50 mg/g and 5 mg/g, or between 25 mg/g and 5 mg/g.

5. Method of producing a pasta filata cheese according to one of embodiments 1 to 3, wherein the lactic acid bacteria are not capable to metabolize lactose and wherein before addition of the starter culture the total concentration of carbohydrates that can be metabolized by the lactic acid bacteria in the milk is below 45 mg/g.

6. Method of producing a pasta filata cheese according to one of embodiments 1 to 3, wherein the lactic acid bacteria are capable to metabolize lactose and galactose but glucose deficient.

7. Method of producing a pasta filata cheese according to one of embodiments 1 to 6, wherein the fermentation is carried out in the presence of lactase in an initial concentration of 500 to 5000 NLU/I.

8. Method of producing a pasta filata cheese according to one of embodiments 1 to 7, wherein the termination of fermentation is caused by a decrease of the total concentration of the one or several carbohydrates that can be metabolized by the lactic acid bacteria to a value of less than 30 mg/g, including a range between 25 mg/g and 0.01 mg/g, or a range between 5 mg/g and 0.01 mg/g.

9. Method of producing a pasta filata cheese according to one of embodiments 1 to 8, wherein the pH value of the fermented product is maintained within a range of 0.3 pH units over a period of 20 hours when stored at the temperature for fermentation.

10. Method of producing a pasta filata cheese according to one of embodiments 1 to 9, wherein the fermentation is carried out at a temperature between 30 and 45° C.

11. Method of producing a pasta filata cheese according to one of embodiments 1 to 10, wherein after termination of fermentation the fermented product is packaged at a temperature between 15 and 45° C.

12. Method of producing a pasta filata cheese according to one of embodiments 1 to 11, wherein the fermented product
    is characterized in that the pH value of the product is maintained within a range of 0.3 pH units if stored after termination of the fermentation for a period of 6 months or is characterized in that the pH value of the product is maintained within a range of 0.3 pH units if stored after termination of the fermentation for a period of 12 months.

13. Fermented milk product obtainable by a method of any one of embodiments 1 to 12, wherein the milk product is a pasta filata cheese.
14. Fermented milk product according to embodiment 13, wherein the pasta filata cheese is selected from Mozzarella, Provolone, Caciocavallo, Pallone di Gravina, and Scamorza.

In more detail, the method of producing a pasta filata cheese of the present invention may comprises the following method steps:
  obtaining a milk product with standardized protein, fat and solids;
  adjusting temperature to coagulation temperature (32-38° C.);
  addition of the Acidifix culture (*Streptococcus thermophilus* CHCC17861 and *Lactobacillus delbrueckii* subsp. *bulgaricus* CHCC18944);
  addition of coagulant;
  coagulation of the milk in 15-60 minutes, cutting and stirring of the curd;
  optionally heating (scalding) of the curd;
  acidification of the curd (either covered by whey or drained from whey);
  stretching of the curd in hot water or by steam injection (in a 'dry stretcher') or by other means of heating and mechanically working the curd;
  forming and cooling the cheese;
  cooling and salting the cheese;
  packing the cheese.

In an alternative embodiment, the method of producing a pasta filata cheese of the present invention may comprises the following method steps:
  obtaining a milk product with standardized protein, fat and solids;
  addition of sucrose sufficient for the acidification culture;
  adjusting temperature to coagulation temperature (32-38° C.);
  addition of the Acidifix culture (*Streptococcus thermophilus* CHCC17861 and *Lactobacillus delbrueckii* subsp. *bulgaricus* CHCC18944);
  addition of coagulant;
  coagulation of the milk in 15-60 minutes, cutting and stirring of the curd;
  optionally heating (scalding) of the curd;
  acidification of the curd (either covered by whey or drained from whey);
  cooling of the acidified curd;
  stretching of the curd in hot water or by steam injection (in a 'dry stretcher') or by other means of heating and mechanically working the curd;
  forming and cooling the cheese;
  cooling and salting the cheese;
  packing the cheese.

In an alternative embodiment, the method of producing a pasta filata cheese of the present invention may comprises the following method steps:
  obtaining a milk product with standardized protein, fat and solids;
  addition of sucrose sufficient for the acidification culture;
  adjusting temperature to coagulation temperature (32-38° C.);
  addition of the Acidifix culture (*Streptococcus thermophilus* CHCC17861 and *Lactobacillus delbrueckii* subsp. *bulgaricus* CHCC18944);
  addition of coagulant;
  coagulation of the milk in 15-60 minutes, cutting and stirring of the curd;
  optionally heating (scalding) of the curd;
  acidification of the curd (either covered by whey or drained from whey);
  storing the acidified curd at a temperature between 6 and 25° C.;
  stretching of the curd in hot water or by steam injection (in a 'dry stretcher') or by other means of heating and mechanically working the curd;
  forming and cooling the cheese;
  cooling and salting the cheese;
  packing the cheese.

In all embodiments the cheese may be sliced, shred, chunk, dice or portioned by other means before packing.

FIGURE LEGENDS

FIG. 1 compares the acidification activity of the *S. thermophilus* strain CHCC6008 when used to inoculate milk containing 1 and 3% lactose.

FIG. 2 compares the acidification activity of *S. thermophilus* CHCC15914 and *Lactobacillus delbrueckii* ssp. *bulgaricus* CHCC10019 to the acidification activity of *S. thermophilus* CHCC17862 and *lactobacillus delbrueckii* ssp. *bulgaricus* CHCC18944 when used to ferment milk supplemented with sucrose.

LAB STRAINS

The subsequent examples use CH strains, some of which have been deposited for prior patent applications of Chr. Hansen. Further information on the strains is provided by the respective patent application and the deposit as follows:

*Streptococcus thermophilus* CHCC6008 was deposited for WO2011/000879 with DSMZ-Deutsche Sammlung von Mikroorganismen und Zellkulturen GmbH, Inhoffenstr. 7B, D-38124 Braunschweig on 2006 Mar. 23 under the accession no. DSM 18111.

*Lactobacillus delbrueckii* ssp. *bulgaricus* CHCC10019 was deposited for WO2011/000879 with DSMZ-Deutsche Sammlung von Mikroorganismen und Zellkulturen GmbH, Inhoffenstr. 7B, D38124 Braunschweig on 2007 Apr. 3 under the accession no. DSM 19252.

*Streptococcus thermophilus* CHCC15757 was deposited for WO2013160413 with DSMZ-Deutsche Sammlung von Mikroorganismen und Zellkulturen GmbH, Inhoffenstr. 7B, D-38124 Braunschweig on 2012 Apr. 3 under the accession no. DSM 25850.

*Streptococcus thermophilus* CHCC16404 was deposited for WO2013160413 with DSMZ-Deutsche Sammlung von Mikroorganismen und Zellkulturen GmbH, Inhoffenstr. 7B, D-38124 Braunschweig on 2012 Dec. 12 under the accession no. DSM 26722.

*Lactobacillus delbrueckii* subsp. *bulgaricus* CHCC16159 was deposited for WO2013160413 with DSMZ-Deutsche Sammlung von Mikroorganismen und Zellkulturen GmbH, Inhoffenstr. 7B, D-38124 Braunschweig on 2012 Sep. 6 under the accession no. DSM 26420.

The remaining strains used in the subsequent examples have either been deposited for the present application or are commercially available from Chr. Hansen.

Example 1: Methods for Producing a Fermented Milk Product Using Low Lactose Milk Customized milk containing 1% lactose (10 g/L) was obtained (from Select Milk Producers, Inc., Texas, USA). A milk containing 3% lactose (30 g/L) was prepared by adding 2% lactose (20 g/L) to the 1% lactose milk.

The milk was inoculated with *S. thermophilus* strain CHCC6008 (0.01% F-DVS) and maintained at a temperature of 37° C. for 20 hours. The acidification (pH value) was determined automatically over time.

Figure 1:
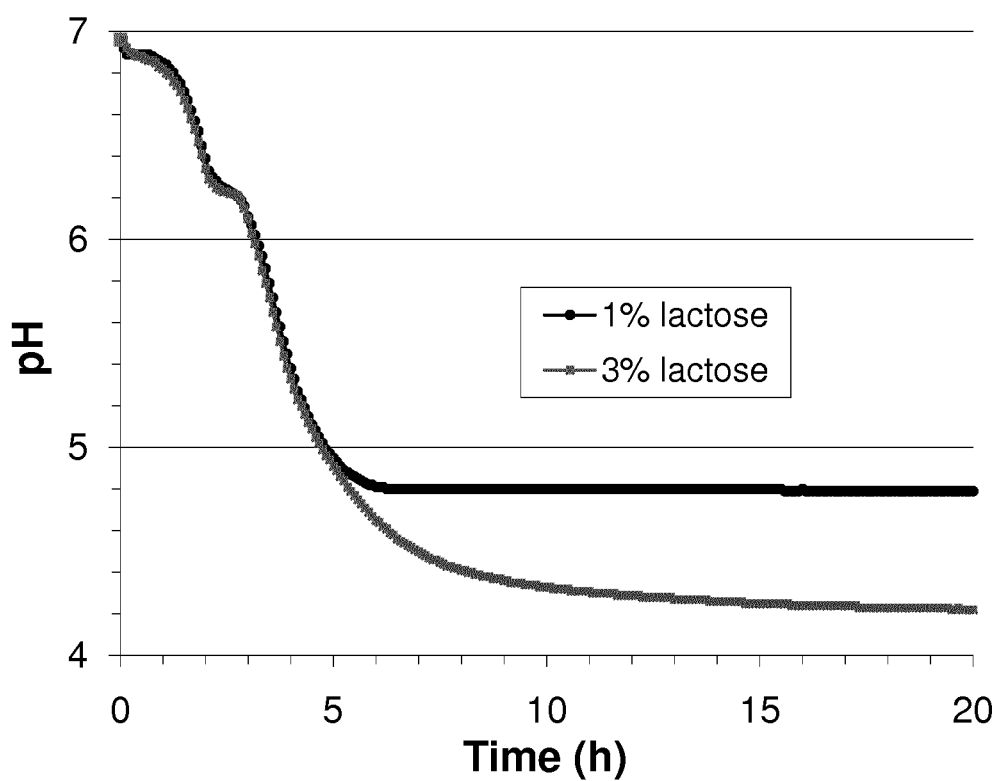

The result is shown in FIG. 1. The fermentation using 1% lactose shows a close to ideal acidification profile. Initially, the product is acidified at a high rate, but acidification stops abruptly at pH 4.8 after about 6 hours and the pH of the culture remained unchanged for the next 14 hours although the culture was maintained at a temperature of 37° C. This shows that acidification is completely terminated.

The fermentation using 3% lactose was used as a control. Initially the product is acidified at the same rate as the fermentation based on 1% lactose. This shows that the lactose concentration of 1% (10 mg/g) is not too low to inhibit fermentation in the initial phase.

But the fermentation using 3% lactose is not terminated at pH 4.8 but continues acidification until a pH of about 4.5 is reached at which state the presence of the acid produced by the bacteria inhibits further fermentation. As a consequence, the fermentation proceeds at a low rate until a pH of about 4.2 is reached.

These results prove that the carbohydrate (here lactose) concentration can surprisingly be used to control the termination of fermentation. This way of proceeding allows processes, wherein the desired pH value is obtained by fermentation and no post acidification is observed afterwards.

Example 2: Methods for Producing a Milk Product Using Lactose Deficient LAB

Lactose deficient mutants were isolated from the EPS positive strains *S. thermophilus* (ST) CHCC15914 and *Lactobacillus delbrueckii* ssp. *bulgaricus* (LB) CHCC10019. The strains were selected after UV-mutagenesis as white colonies (indicating a lactose deficient phenotype) on M17 with 1% lactose and 200 mg/ml X-Gal for CHCC15914, resp. MRS agar plates with 1% lactose and 200 mg/ml X-Gal for CHCC10019.

Both wild type strains possess β-galactosidase activity, and wild type colonies appeared blue due to the activity of the β-galactosidase.

From CHCC10019 one lactose deficient mutant was isolated and designated CHCC18944 (this mutant was identified as CHCC18994 in European Patent Application 14173196; but the internal Accession No. of the Applicant was changed and now is CHCC18944; the DSMZ Accession No. was not changed and thus still is DSM28910).

From CHCC15914 two lactose deficient mutants were isolated and designated CHCC17861 and CHCC17862, respectively.

The growth characteristics of the isolated lactose deficient mutants were determined as follows:
Phenotype of LB CHCC18944: lac−, suc−, gal−, glc+
Phenotype of ST CHCC17861: lac−, suc+, gal+, glc+
Phenotype of ST CHCC17862: lac−, suc+, gal+, glc+

The complete lactose operon was sequenced for all three mutants and compared with the respective wild type strain to reveal the mutation type.

Comparison with the mother strain CHCC15914 revealed that CHCC17861 had an extra "T" nucleotide in the beginning of the lacZ gene (coding for the β-galactosidase) leading to a stop codon in the coding sequence a few nucleotides downstream of the mutation. CHCC17862 showed a deletion of one nucleotide, also interrupting the coding sequence of the lacZ gene.

For CHCC18944 a mutation inside the lacZ gene was identified. This resulted in an exchange of 8 nucleotides (5'-CTT CCA AGC-3' to 5'-CGC TAC TAT-3') and consequently a change of 3 amino acids (Leu-Pro-Ser to Arg-Tyr-Tyr) within lacZ, explaining the lactose deficient phenotype.

All mutants when used as single strains or in combination (ST+LB), acidify milk depending on the addition of a fermentable carbohydrate different from lactose. The acidification activity of the lactose deficient cultures were for example determined using over-night cultures in MRS (LB wt and LB lac-mutant); M17 with 1% lactose (ST wt); or M17 with different concentrations of sucrose (1% and 0.5%; fermentation with the ST lac-mutant). The milk was inoculated and fermentation was monitored by pH development at 37° C.

Figure 2:
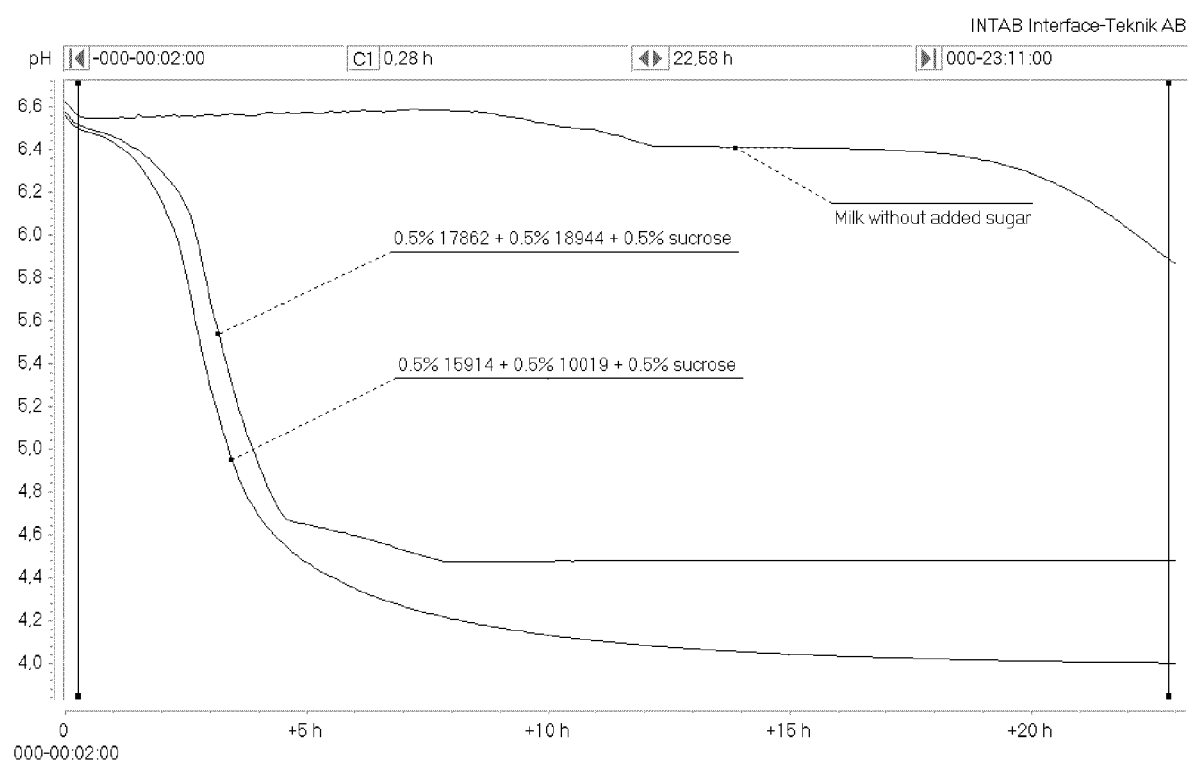
Figure 3:
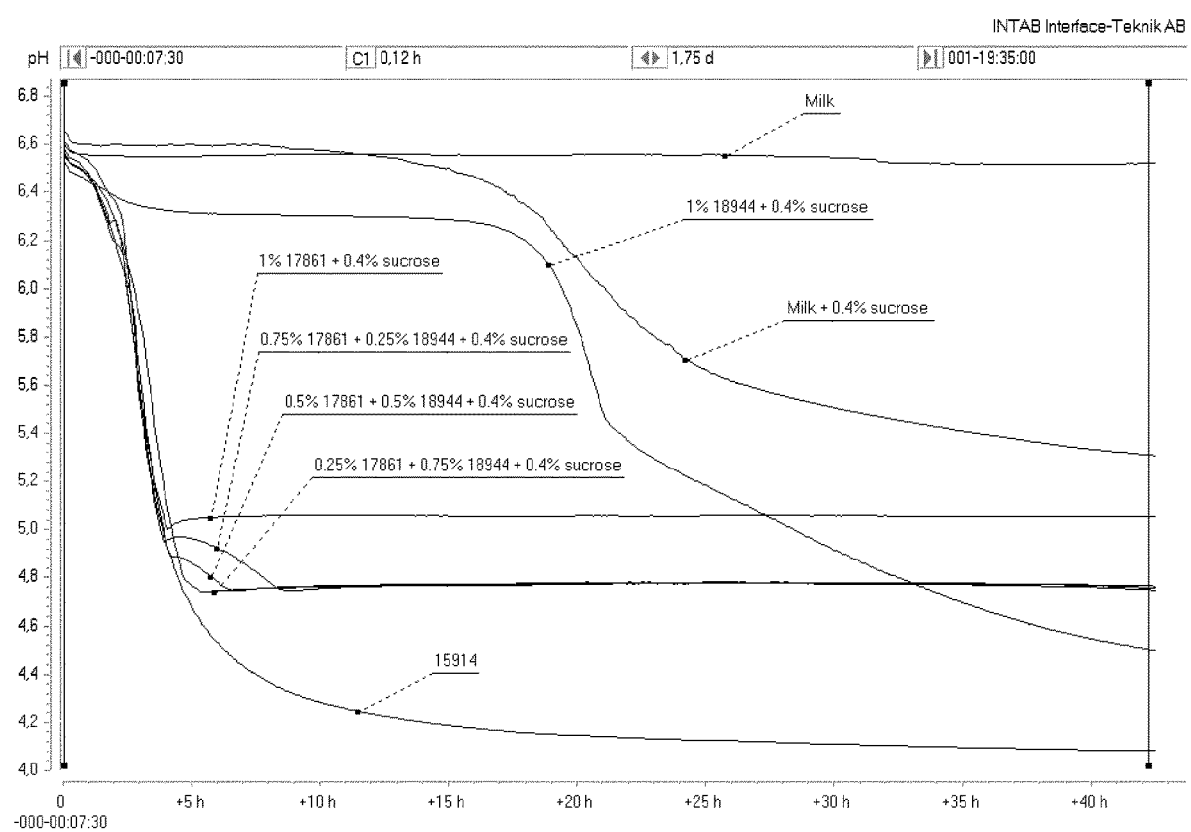
FIG. 3 shows the acidification activity of different ratios of *S. thermophilus* CHCC17861 and *Lactobacillus delbrueckii* ssp. *bulgaricus* CHCC18944 when used to ferment milk supplemented with sucrose and compared to the acidification activity of *S. thermophilus* CHCC15914.

The pH development under fermentation temperature over 20 and 40 hours is illustrated in FIGS. 2 and 3 respectively and shows that sucrose is metabolized by the lactose deficient strains yielding a fermentation process that is nearly as fast as the process caused by the parental LAB having the ability to metabolize lactose. The sucrose driven fermentation process is immediately terminated and enters a flat line when the sucrose was depleted. After termination of the fermentation caused by carbohydrate depletion the pH remained stable at about pH 4.5. A very stable final pH was found when CHCC17861, CHCC17862, or CHCC18944, were used as single strains, or as a mix of one of the ST mutants together with the LB mutant (mix is shown in FIG. 3). This resembles the starter culture to be used in a fermentation method for producing a typical yoghurt.

No significant difference between the strains CHCC17861 and CHCC17862 could be observed. The addition of sucrose therefore provides a very precise control of acidification activity.

In some fermentations the formation of a "shoulder" was observed within the pH-curves of the mixed cultures indicating that the metabolism shifted before the acid production completely stopped (FIG. 3). To investigate this further the ratio of ST:LB was changed and this led to a change in the shoulder formation. Decrease of the concentration of the lac-ST and increase of the lac-LB strain resulted in a reduction of the pH shoulder and an even more horizontal pH-"curve".

Interestingly, the use of 100% ST CHCC17861, on the other hand, leads to a completely interrupted acid production when sucrose is depleted and eliminates the pH shoulder, but the pH drop stops at a 0.3 point higher pH value (FIG. 3).

In all cases the pH remained stable at 4.75 up to the end of the fermentation period (48 hours).

In ST/LB co-fermentation the *Lactobacillus delbrueckii* subsp. *bulgaricus* part is responsible for the final pH drop and also for a major part of the post acidification. For this reason the concentration of LB is lower than the concentration of ST in most yoghurt fermentation processes.

This shows that the pH value can be completely controlled by the concentration of the added sucrose or another fermentable carbohydrate, as the Lb. *Bulgaricus* can easily be increased.

The lac-culture will not only result in a higher final pH after e.g. 6 hours, but will also have a significantly lower post acidification and thus extended shelf life.

In some experiments it was observed that the pH was very stable for about 5 hours after termination of fermentation and then slightly declined over the next 10 hours (data not shown). This is apparently due to spontaneous revertants, i.e. LAB gaining the ability to utilize lactose by spontaneous mutation.

Example 3: Methods of Producing a Fermented Milk Product with an Extended Shelf Life Yoghurt with an extended shelf life (ESL yoghurt) was produced by fermenting milk with the commercially available FD-DVS YFL-904 and in a separate fermentation with the new culture F-DVS Acidifix 2.0 (containing *Streptococcus thermophilus* CHCC17861 and *Lactobacillus delbrueckii* subsp. *bulgaricus* CHCC18944, described in Example 2).

TABLE 1

Recipe ESL yoghurt:
Milk Base

| Ingredients | Specification | Dosage |
| --- | --- | --- |
| Fresh Milk | Meiji, 2 L bottle | 97.95% |
| Thermex | Modified starch, Ingredion | 1.00% |
| LM 106-AS-YA | Pectin, CP Kelco | 0.15% |
| Kelcogel YSS | Gellan Gum, CP Kelco | 0.03% |
| Sugar | Refined sugar, Phoon Huat | 0.87% |
| Cultures | FD-DVS-YF-L904 | 100 u/mt |
|  | F-DVS-Acidifix | 100 u/mt |

Milkoscan analysis: Fat: 3.70% Protein: 3.05%
12% sugar syrup ws added to the white mass after fermentation The following parameters were used for fermentation and processing:
Mixing temperature: 45° C.-50° C.
Hydration time: 20 minutes
Process:
Homogenization pressure: 150 bar+30 bar (total 180 bar)
Pasteurization condition: 95° C./4 min
cooling temperature: less than 10° C.
Fermentation:
Fermentation temperature: 43° C. for YF-L904 and 39° C. for Acidifix
End pH: 4.35±0.05
Break the curd manually when desired pH is achieved.
Add 12% of sugar syrup into 88% of fermented milk base. Manually stir to mix it well.
Thermise the yoghurt through GEA pilot plant:
Homo pressure: 0 bar
Thermisation condition: 65° C./30 s
Filling into bottles (filling temperature: 28° C.-33° C.).

Figure 4:
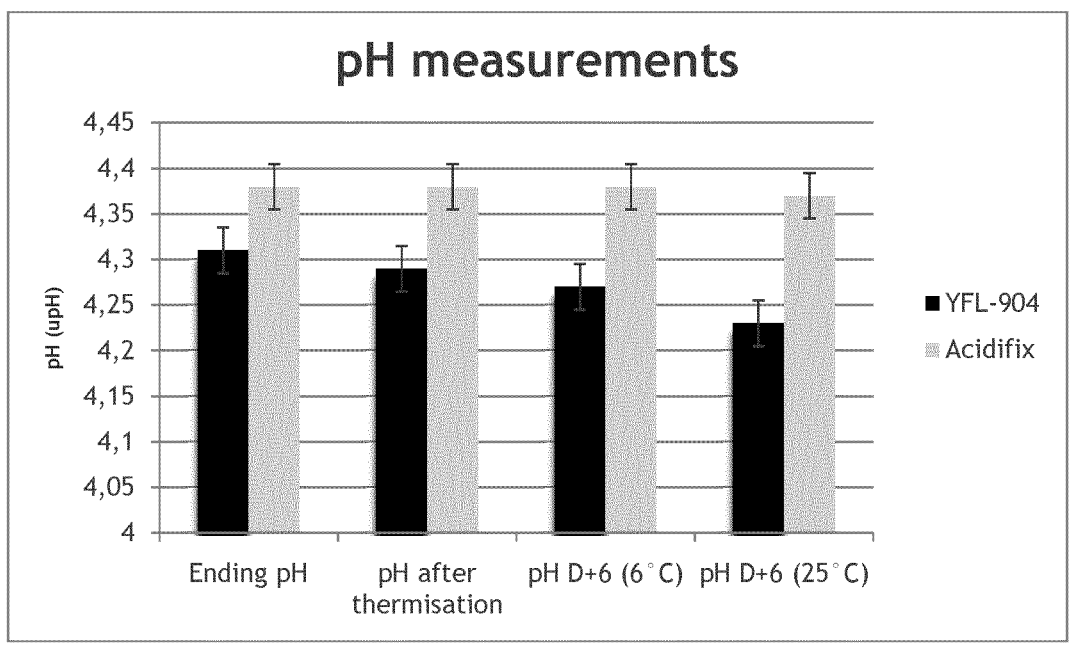
FIG. 4 shows post acidification, i.e. the development of pH in two different fermented milk products after fermentation using the method of the invention (Acidifix) and a prior art method (YFL-904).

The post acidification activity was analyzed for both products directly after fermentation, after thermisation and after 6 days storage at different temperatures. Results are illustrated in FIG. 4 and show high stability of pH of the product obtained with Acidifix during processing and storage.

Example 4: Methods of Producing a Fermented Milk Product Using Glucose Deficient LAB Material and Methods
Milk base (1.0% fat & 4.5% protein):
Ingredients: Mix of commercial milk (1.5% fat+0.5% fat+ skim milk powder to reach the required fat and protein level) 9.5% w/w skimmed milk powder+90.5% tap water
Commercial milk: Arla Harmonie minimælk (0.5% fat) and Arla Harmonie letmælk (1.5% fat)
Skimmed milk powder: Arla Foods, Gin 990214
Procedure: Mix milk and powder stir, heat treat 90° C., 20 min
Lactose:
Product: Lactosemonohydrate (Gin 500449, Batch 0005078607)
Producer: German Lac-Sachsenmilch
Added as a 19% w/w solution to the yoghurt base, to obtain the right level as prescribed
Recipe: 0.6 kg lactose monohydrate+2.4 kg tap water
Process: Heat while stirring, before pasteurization (95° C., 5 min)
Starter Cultures:
F-DVS Sweety 1.0 consists of a blend of the following strains
2-deoxy-glucose resistant strains
*Streptococcus thermophilus* CHCC16731 (hyper-lactose fermenting and glucose secreting mutant of CHCC11976).
*Streptococcus thermophilus* CHCC15757 (2-deoxyglucose resistant mutant of CHCC14944).
*Streptococcus thermophilus* CHCC16404 (hyper-lactose fermenting and glucose secreting mutant of CHCC15757).
*Lactobacillus delbrueckii* subsp. *bulgaricus* CHCC16159 (2-deoxyglucose resistant mutant of CHCC10019).
Low Post Acidification Properties of Hyper-Lactose Fermenting and Glucose Secreting Mutants of *Streptococcus thermophilus* and *Lactobacillus delbrueckii* Subsp. *Bulgaricus*.

Selection of a hyper-lactose fermenting and glucose secreting mutant of *Streptococcus* thermophilus and *Lactobacillus delbrueckii* subsp. *bulgaricus* were carried as described in WO2013/160413 entitled "Use of lactic acid bacteria for preparing fermented food products with increased natural sweetness".

To show the low post acidification properties of the culture in a standard setup for yoghurt production, 0.024% of a Frozen Direct Vat Set culture (F-DVS) of Sweety 1.0 culture blend was used to inoculate 3 l of milkbase and the milk was fermented at 43° C.

Figure 5:
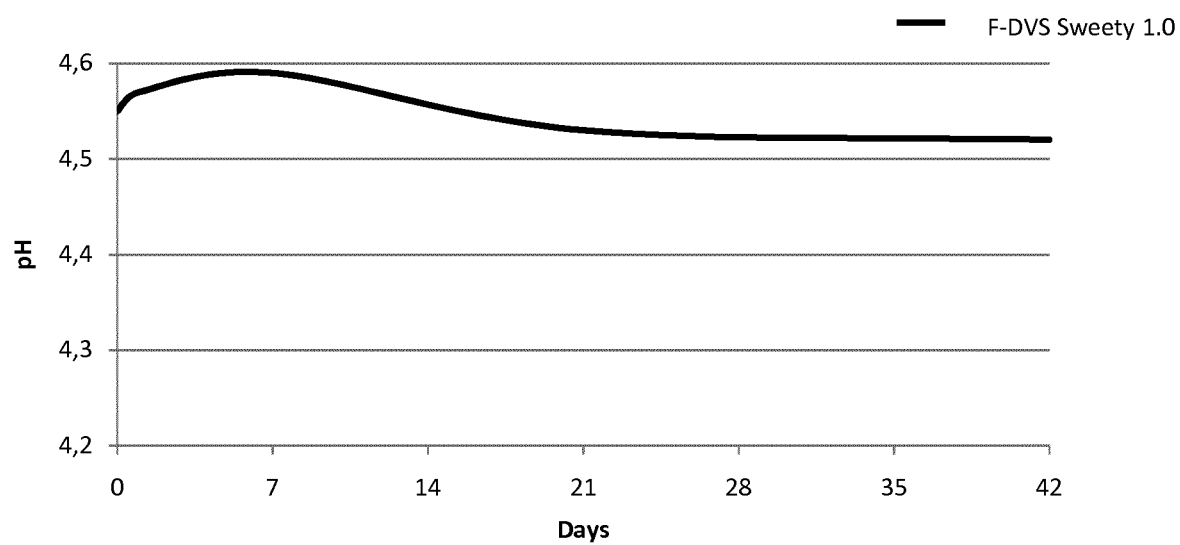
FIG. 5 shows the development of pH in a culture fermented with Sweety after termination of fermentation at 6° C. for 42 days (i.e. post acidification). The Figure shows that the pH varies less than 0.1 pH units under these conditions.

Acidification was followed with a CINAC pH logger (Alliance instruments) with standard pH electrodes and CINAC 4.0 software. When the pH reached 4.55 at 43° C. coagulation of the milk had taken place. The yoghurt was subsequently cooled and incubated at 7±1.5° C. for 42 days. The pH development was subsequently followed over a period of 42 days (FIG. 5). As can be seen from FIG. 5 the pH development after 42 days of storage of 7±1.5° C. is less than 0.1 pH units confirming an extremely low level of post acidification.

This data show that yoghurt blends of the glucose secreting strains and the use of the methods of the present invention will coagulate milk, maintain the final pH very stable for 43 days at 7±1.5° C. and increase the sweetness of the fermented product.

Mixed cultures of glucose secreting *Streptococcus* and *Lactobacillus delbrueckii* subsp. *bulgaricus* metabolize all or almost all lactose present in milk during fermentation. As a consequence, the LAB no longer cause post acidification.

Example 5: Low Post Acidification when Using Lactase in the Fermentation of Yoghurt It was surprisingly found that the addition of lactase to a method of preparing a yoghurt significantly reduces post acidification in comparison to a yoghurt made without lactase.
Materials and Methods
Milk base (0.1% fat & 4.5% protein):
Ingredients: Mix of commercial milk (0.1% fat) and skimmed milk powder to reach the protein level.
Commercial milk: Arla skummetmælk (0.1% fat)
Skimmed milk powder: Milex 240, Arla Foods, lot 990214
Procedure: Mix powder and milk, hydration at 5° C. overnight, heat treatment 90° C./20 min.
Lactase:
Product: Ha-Lactase 5200 (Gin 450805)
Producer: Chr. Hansen A/S
Starter Cultures:
F-DVS YF-L706, Gin 685141
F-DVS YF-L901, Gin 685142
F-DVS YoFlex® Mild 1.0, Gin 702897
F-DVS YoFlex® Creamy 1.0, Gin 706168
F-DVS YoFlex® Premium 1.0, Gin 706161
All from Chr. Hansen A/S The fermentations were done in 3 l scale. The cultures were inoculated at 0.02%, and the samples were fermented at 43° C. Lactase in a dosage of 3500 NLU/l was added to the milk base together with the culture. Acidification was monitored with a pH-Meter 1120 (Mettler-Toledo AG, 52120653), and fermentation stopped at pH 4.55. The fermented milk products were stirred in a standardized way, and further pressurized and cooled (2 bar, 25° C.), before storing at 6° C. pH of the samples were then monitored at 1, 7, 14, 21 and 48 days using a pH-Meter 1120 (Mettler-Toledo AG, 52120653). Concentrations of lactose, glucose and galactose (mg/g) in yoghurt on day 1 after fermentation were determined using HPLC with a Dionex CarboPac PA 20 3*150 mm column (Thermo Fisher Scientific, product number 060142).

Figure 6:
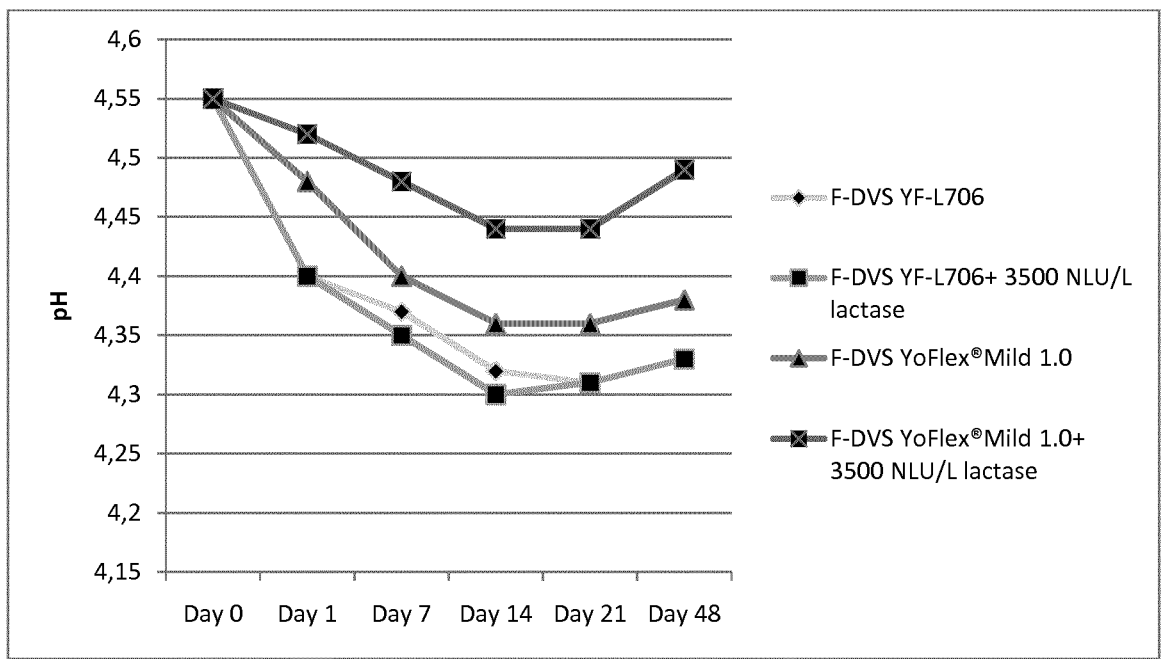
FIG. 6 shows the development of the pH in different cultures fermented with and without lactase during storage at cooling temperature over a period of 48 days.
Figure 7:
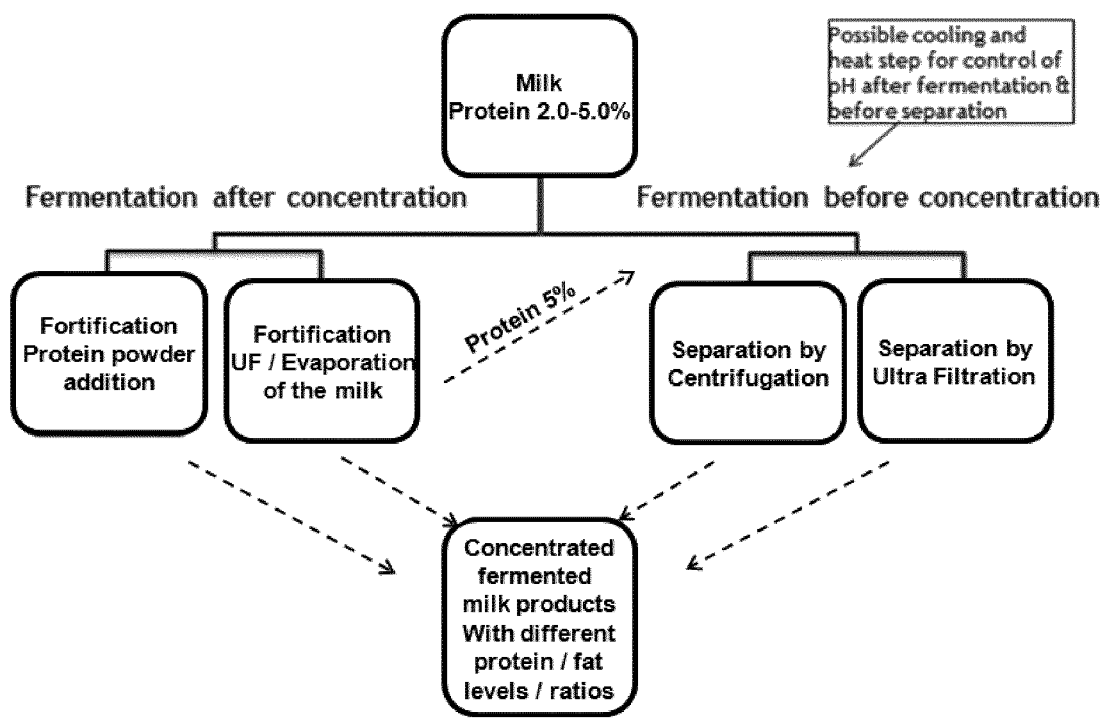
FIG. 7 shows an overview over methods using concentration of protein prior to fermentation (left hand side) and concentration of protein after fermentation by separation using centrifugation or ultrafiltration (right hand side).
Figure 8:
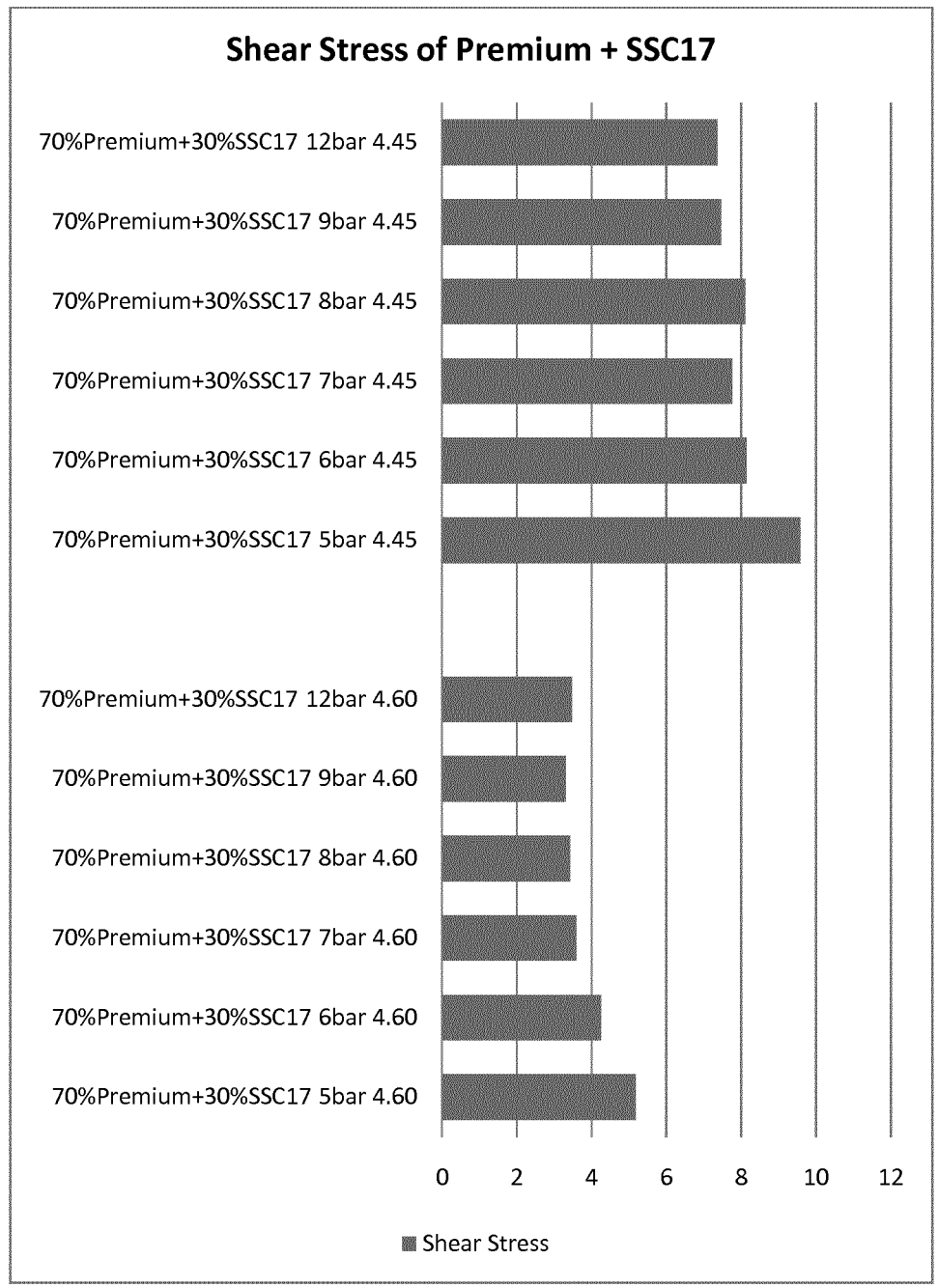
FIG. 8 shows the effect of pH on shear stress during separation of whey from a milk product after fermentation with SSC17.
Figure 9:
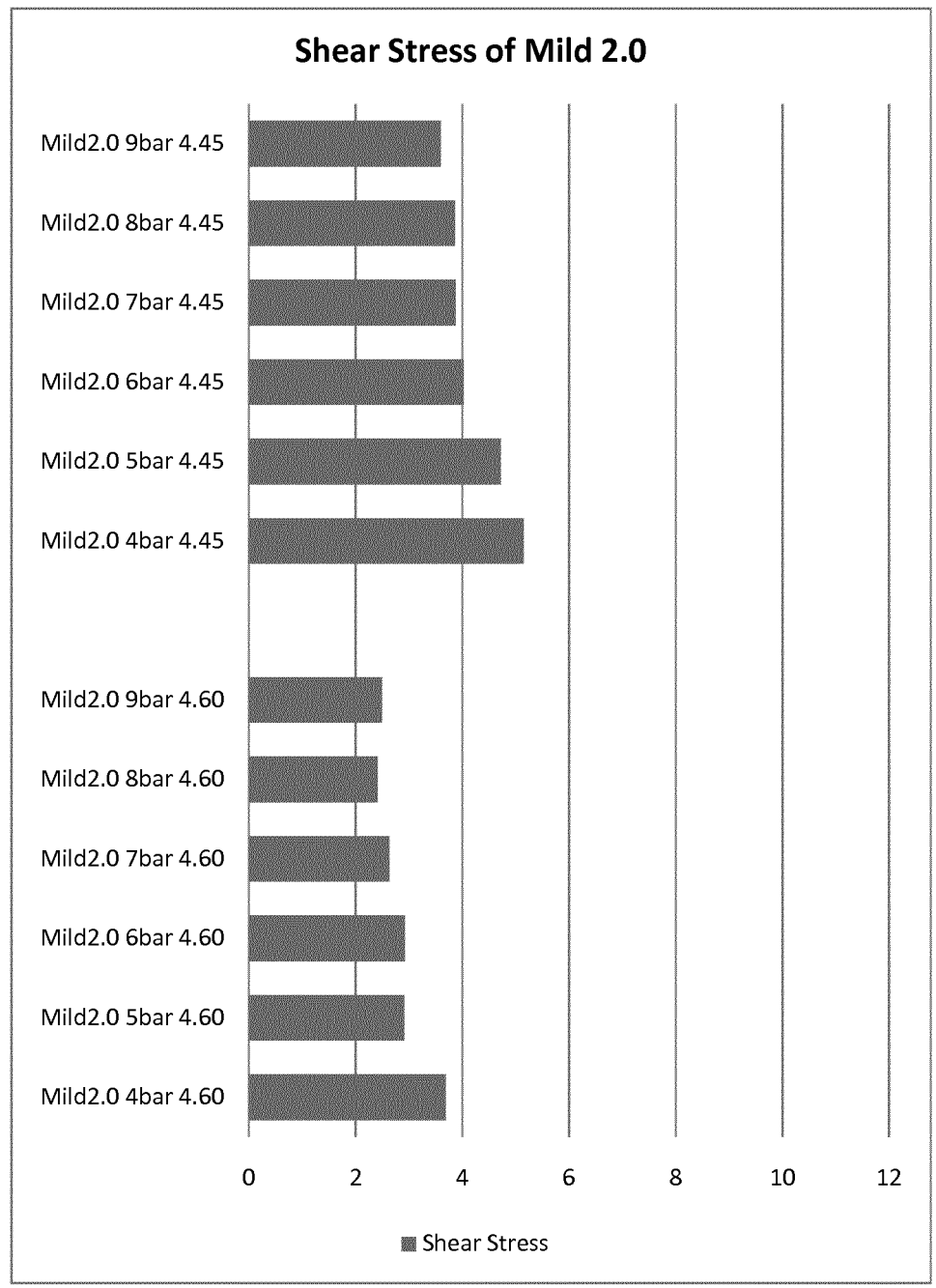
FIG. 9 shows the effect of pH on shear stress during separation of whey from a milk product after fermentation with Mild2.0.
Figure 10:
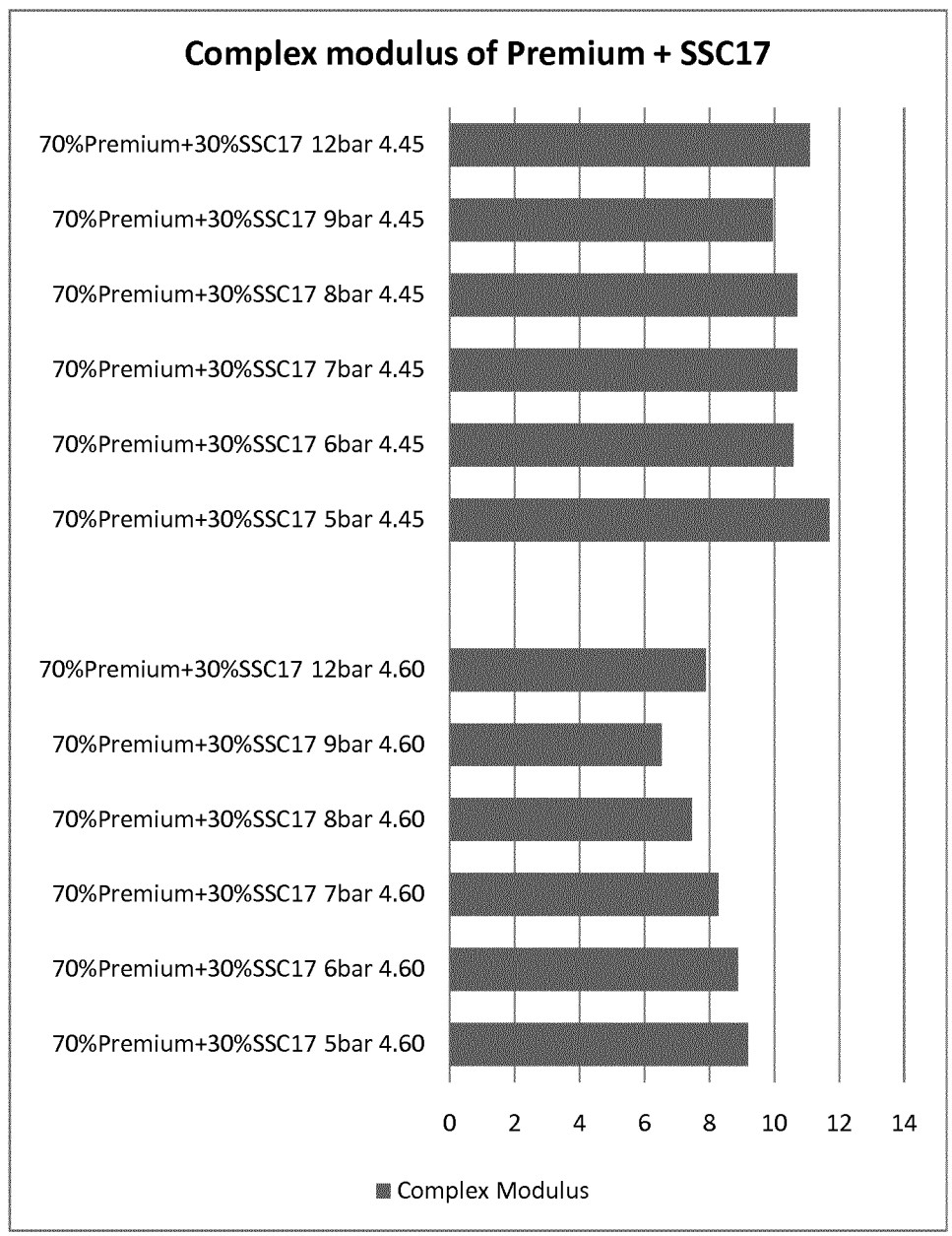
FIG. 10 shows the effect of pH on complex modulus or gel firmness during separation of whey from a milk product after fermentation with SSC17.
Figure 11:
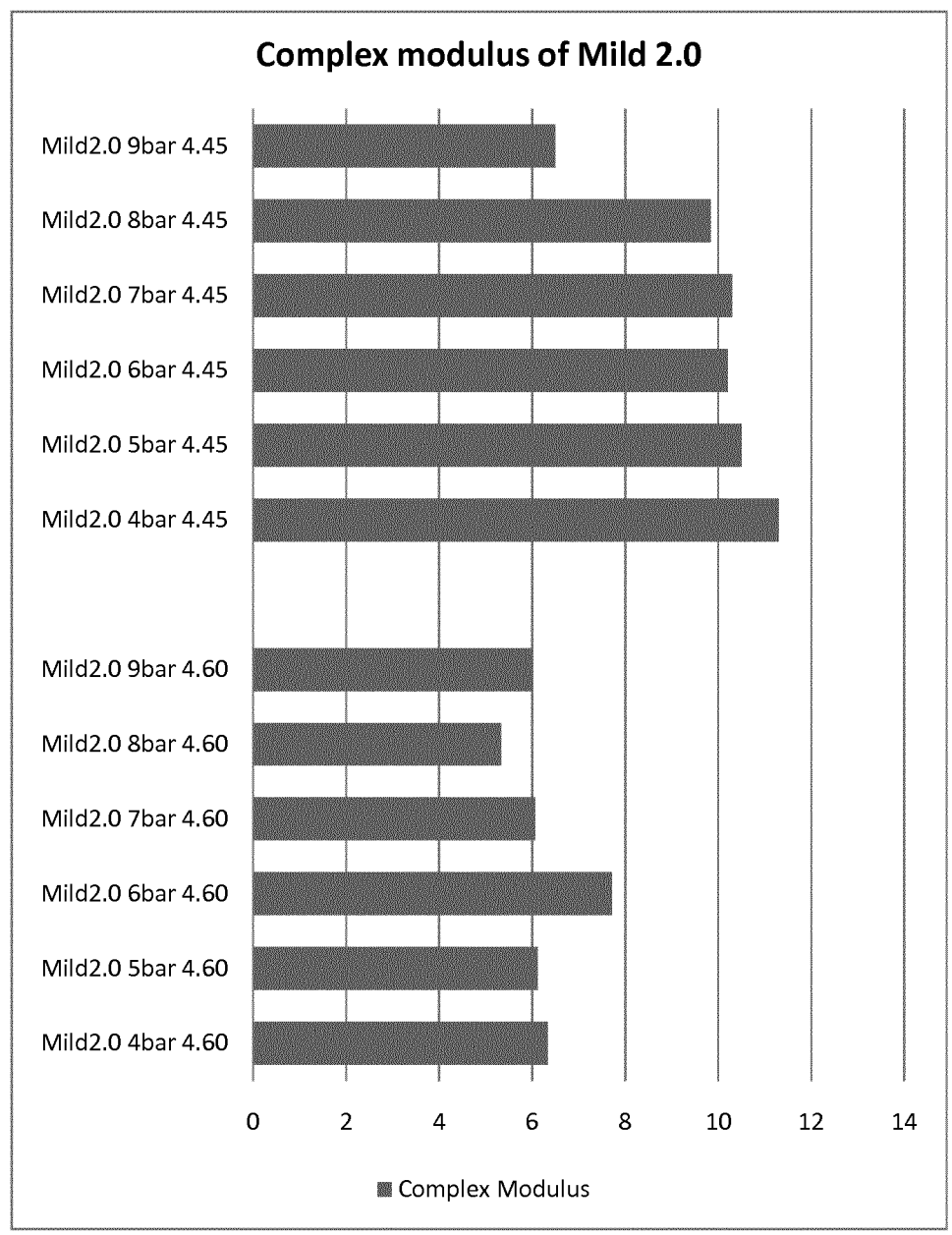
FIG. 11 shows the effect of pH on complex modulus or gel firmness during separation of whey from a milk product after fermentation with Mild2.0.

Results are shown in FIG. 6, which illustrates the development of pH value during storage and thus post acidification. Further results are shown table 1, below which provides an overview over the difference in the pH value obtained in the yoghurts produced with and without lactase with different cultures. The difference is caused by post acidification and was determined using F-DVS YoFlex® Mild 1.0 yoghurt as example: F-DVS YoFlex® Mild 1.0 yoghurt with 3500 NLU/L lactase had a pH after 21 days of 4.44, while F-DVS YoFlex® Mild 1.0 yoghurt without lactase had a pH of 4.36. Fermentation was stopped at 4.55 for both yoghurts. The post acidification for the lactase treated yoghurt was 4.55−4.44=0.11, for the yoghurt without lactase it was 4.55−4.36=0.19. The difference in post acidification between yoghurt fermented with F-DVS YoFlex® Mild 1.0 with and without 3500 NLU/L lactase is thus 0.19−0.11=0.08.

TABLE 2

Difference in post acidification between yoghurts produced with the cultures in the table at 0.02%, with and without 3500 NLU/L lactase.

| Culture | Day 21 | Day 48 |
| --- | --- | --- |
| F-DVS YF-L706 | 0.00 | 0.00 |
| F-DVS YF-L901 | 0.04 | 0.04 |
| F-DVS YoFlex ®Creamy | 0.10 | 0.07 |
| F-DVS YoFlex ®Premium 1.0 | 0.08 | 0.08 |
| F-DVS YoFlex ®Mild 1.0 | 0.08 | 0.11 |

The data presented shows that select Chr. Hansen commercial cultures in combination with lactase can be used to obtain yoghurt with reduced post acidification. F-DVS YoFlex® Mild 1.0, F-DVS YoFlex® Creamy 1.0 and F-DVS YoFlex® Premium 1.0, all show low post acidification. The reduction of post acidification is less pronounced in the culture YF-L901 and no reduction of post acidification is observed for F-DVS YF-L706.

TABLE 3

Concentrations of lactose, glucose and galactose (mg/g) in yoghurt produced with and without 3500 NLU/L lactase on day 1 after fermentation determined using HPLC.

| Culture | Galactose (mg/g) | Glucose (mg/g) | Lactose (mg/g) |
| --- | --- | --- | --- |
| F-DVS YF-L706 | 9.2 | 0.4 | 42.3 |
| F-DVS YF-L706 + 3500 NLU/lactase | 26.2 | 21.8 | 2.0 |
| F-DVS YF-L901 | 10.6 | 1.6 | 39.4 |
| F-DVS YF-L901 + 3500 NLU/lactase | 26.1 | 21.4 | 2.1 |
| F-DVS YoFlex ®Creamy 1.0 | 7.7 | 0.0 | 43.4 |
| F-DVS YoFlex ®Creamy 1.0 + 3500 NLU/lactase | 23.1 | 21.2 | 5.3 |
| F-DVS YoFlex ®Premium 1.0 | 7.7 | 0.6 | 41.7 |
| F-DVS YoFlex ®Premium 1.0 + 3500 NLU/lactase | 25.1 | 23.8 | 2.0 |
| F-DVS YoFlex ®Mild 1.0 | 7.7 | 0.6 | 42.2 |
| F-DVS YoFlex ®Mild 1.0 + 3500 NLU/lactase | 25.4 | 24.1 | 2.9 |

Table 3 shows that the cultures fermented in the presence of lactase have very low residual lactose but higher residual glucose and galactose concentrations. The fact that post acidification is observed for the strains can thus be explained by the high total residual amount of carbohydrates available for the metabolism of the LAB.

The extent of post acidification is still very low and thus surprising in view of the residual concentrations of carbohydrates. The low post acidification appears to be caused by the need for a metabolic shift of the carbohydrate source in the microorganisms. In other words, the cultures showing low post acidification contain strains that struggle with the shift from lactose to glucose as the carbohydrate source.

Deposit and Expert Solution

The applicant requests that a sample of micro-organisms deposited for the present application as described below may only be made available to an expert, until the date on which the patent is granted.

Streptococcus thermophilus CHCC16731 was deposited with DSMZ-Deutsche Sammlung von Mikroorganismen und Zellkulturen GmbH, Inhoffenstr. 7B, D-38124 Braunschweig, on 2014-06-04 under the accession no. DSM 28889.

Streptococcus thermophilus CHCC15914 was deposited with DSMZ-Deutsche Sammlung von Mikroorganismen und Zellkulturen GmbH, Inhoffenstr. 7B, D-38124 Braunschweig, on 2014-06-12 under the accession no. DSM 28909.

Lactobacillus delbrueckii ssp. bulgaricus CHCC18944 was deposited with DSMZ-Deutsche Sammlung von Mikroorganismen und Zellkulturen GmbH, Inhoffenstr. 7B, D-38124 Braunschweig, on 2014 Jun. 12 under the accession no. DSM 28910.

Streptococcus thermophilus CHCC17861 was deposited with DSMZ-Deutsche Sammlung von Mikroorganismen und Zellkulturen GmbH, Inhoffenstr. 7B, D-38124 Braunschweig, on 2014-06-12 under the accession no. DSM 28952.

Streptococcus thermophilus CHCC1 7862 was deposited with DSMZ-Deutsche Sammlung von Mikroorganismen and Zellkulturen GmbH, Inhoffenstr. 7B, D-38124 Braunschweig, on 2014-06-12 under the accession no. DSM 28953.

The deposit was made according to the Budapest treaty on the international recognition of the deposit of microorganisms for the purposes of patent procedure.

REFERENCES

US2010/0021586
WO2006/042862A1
WO2010/139765
WO2013/169205
WO2011/000879
Pool et al., Metabolic Engineering, vol. 8, 2006, 456-464

The invention claimed is:

1. A method of producing a fermented milk product with a stable pH, comprising:
   (a) initiating milk fermentation by adding to milk a starter culture comprising lactose-deficient lactic acid bacteria capable of metabolizing one or more fermentable carbohydrates other than lactose, wherein the lactose-deficient lactic acid bacteria comprise lactose-deficient *Streptococcus thermophilus* that has completely lost the ability to use lactose as a source for cell growth or maintaining cell viability, and lactose-deficient *Lactobacillus delbrueckii* subsp. *bulgaricus*, and wherein the milk comprises one or more fermentable carbohydrates other than lactose metabolized by the lactose-deficient lactic acid bacteria, and
   (b) fermenting the milk at a temperature between 22° C. and 45° C., wherein termination of the milk fermentation and the pH value of the fermented milk product at the termination of milk fermentation are controlled by the concentration of the one or more fermentable carbohydrates other than lactose present in the milk, and the milk fermentation terminates when the concentration decreases to a level that can no longer be metabolized by the lactose-deficient lactic acid bacteria to produce a significant amount of lactic acid, wherein the decrease is at least partly caused by the lactic acid bacteria metabolizing the one or more fermentable carbohydrates,
   thereby obtaining a fermented milk product with a stable pH.

2. The method of claim 1, wherein the pH of the fermented milk product is stable such that, upon storage at the fermentation temperature for 20 hours after termination of fermentation, the pH is maintained within a range of 0.3 pH units.

3. The method of claim 1, wherein the pH of the fermented milk product is stable such that, upon storage at the fermentation temperature for 20 hours after termination of fermentation, the pH is maintained within a range of 0.1 pH units.

4. The method of claim 1, wherein the milk comprises lactose at a concentration of from 5 to 100 mg/g at the start of the fermentation.

5. The method of claim 1, further comprising packaging the fermented milk product at a temperature between 15 and 45° C.

6. The method of claim 1, wherein the lactose-deficient lactic acid bacteria are not capable of metabolizing lactose and wherein, prior to adding the starter culture, the milk comprises fermentable carbohydrates that can be metabolized by the lactic acid bacteria at a total concentration of below 45 mg/g.

7. The method of claim 1, wherein the fermentation is carried out in the presence of lactase at an initial concentration of 500 to 5000 NLU/l.

8. The method of claim 1, wherein the fermentation temperature is between 30 and 45° C.

9. The method of claim 1, wherein the pH of the fermented milk product is stable such that upon storage after termination of fermentation for a period of 6 months, the pH is maintained within a range of 0.3 pH units.

10. The method of claim 1, further comprising at least partly separating whey from the fermented milk product, wherein the pH of the fermented milk product prior to separating whey is stable such that, upon storage, processing or maintenance at the fermentation temperature after termination of fermentation for 20 hours, the pH is maintained within a range of 0.3 pH units.

11. The method of claim 10, wherein the pH of the fermented milk product prior to separating whey is stable such that, upon storage, processing or maintenance at the fermentation temperature after termination of fermentation for 20 hours, the pH is maintained within a range of 0.1 pH units.

12. A fermented milk product obtained by the method of claim 1.

13. The fermented milk product of claim 12, wherein the fermented milk product is a yoghurt, a fruit yoghurt, a yoghurt beverage or a cheese.

14. The method of claim 1, wherein the pH of the fermented milk product is stable such that upon storage after termination of fermentation for a period of 12 months, the pH is maintained within a range of 0.3 pH units.

15. The method according to claim 1, wherein the one or more fermentable carbohydrates other than lactose comprises one or more selected from sucrose, galactose and glucose.

16. The method according to claim 1, wherein the one or more fermentable carbohydrates other than lactose comprises sucrose.

17. The method according to claim 1, further comprising adding to the milk the one or more fermentable carbohydrates other than lactose.

18. The method according to claim 1, further comprising adding sucrose to the milk.

19. The method according to claim 1, wherein the milk fermentation terminates when the concentration of the one or more fermentable carbohydrates other than lactose decreases to within a range from 5 mg/g to 0.01 mg/g.

20. The method of claim 1, wherein the lactose-deficient *Streptococcus thermophilus* strain is selected from:
   (i) the strain deposited with Deutsche Sammlung von Mikroorganismen and Zellkulturen GmbH (DSMZ) under accession no. DSM 28952; and
   (ii) the strain deposited with DSMZ under accession no. DSM 28953.

21. The method of claim 1, wherein the lactose-deficient *Streptococcus thermophilus* strain is the strain deposited with DSMZ under accession no. DSM 28952.

22. The method of claim 1, wherein the lactose-deficient *Streptococcus thermophilus* strain is the strain deposited with DSMZ under accession no. DSM 28953.

23. The method of claim 1, wherein the lactose-deficient *Lactobacillus delbrueckii* ssp. *bulgaricus* strain is the strain deposited with DSMZ under accession no. DSM 28910.

\* \* \* \* \*

UNITED STATES PATENT AND TRADEMARK OFFICE
CERTIFICATE OF CORRECTION

| | | |
|---|---|---|
| PATENT NO. | : 10,813,367 B2 | |
| APPLICATION NO. | : 15/317682 | |
| DATED | : October 27, 2020 | |
| INVENTOR(S) | : Garrigues et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 91 days.

Signed and Sealed this
Twentieth Day of December, 2022

*Katherine Kelly Vidal*

Katherine Kelly Vidal
*Director of the United States Patent and Trademark Office*